(12) United States Patent
Baxter et al.

(10) Patent No.: US 6,759,648 B2
(45) Date of Patent: Jul. 6, 2004

(54) SENSOR FOR SENSING ABSOLUTE ANGULAR POSITION OF A ROTATABLE BODY

(75) Inventors: John Baxter, Chatswood (AU); Karl Yarnos Eisenhauer, Swan View (AU)

(73) Assignee: Bishop Innovation Limited, North Ryde (AU)

( * ) Notice: Subject to any disclaimer, the term of this patent is extended or adjusted under 35 U.S.C. 154(b) by 125 days.

(21) Appl. No.: 10/126,950

(22) Filed: Apr. 22, 2002

(65) Prior Publication Data

US 2002/0195551 A1 Dec. 26, 2002

Related U.S. Application Data

(63) Continuation-in-part of application No. 09/463,980, filed as application No. PCT/AU98/00645 on Aug. 14, 1998, now Pat. No. 6,450,044, and a continuation-in-part of application No. 09/744,235, filed as application No. PCT/AU99/00590 on Jul. 21, 1999, now abandoned.

(30) Foreign Application Priority Data

| Aug. 15, 1997 | (AU) | ............................................. PO8566 |
| Oct. 17, 1997 | (AU) | ............................................. PO9847 |
| Feb. 5, 1998 | (AU) | ............................................. PP1676 |
| Apr. 23, 1998 | (AU) | ............................................. PP3142 |
| Jul. 24, 1998 | (AU) | ............................................. PP4825 |

(51) Int. Cl.[7] ............................................. G01D 5/34
(52) U.S. Cl. ............................. 250/231.13; 250/237 G
(58) Field of Search ........................ 250/231.13, 231.14, 250/231.16, 231.18, 237 G; 341/11, 13

(56) References Cited

U.S. PATENT DOCUMENTS

| 3,906,785 A | 9/1975 | Black et al. ................... 73/118 |
| 4,806,751 A | 2/1989 | Abe et al. .................... 250/231 |
| 5,001,937 A | 3/1991 | Bechtel et al. ............ 73/862.34 |
| 5,042,157 A | 8/1991 | Garrett et al. ................. 33/363 |
| 5,235,181 A | 8/1993 | Durana ................... 250/231.16 |
| 5,332,895 A | 7/1994 | Rieder et al. ........... 250/231.14 |
| 5,336,884 A | 8/1994 | Khoshnevisan et al. ...................... 250/231.18 |
| 5,369,583 A | 11/1994 | Hazelden ............... 364/424.05 |
| 5,389,780 A | 2/1995 | Anderson ................... 250/225 |
| 5,490,430 A | 2/1996 | Anderson et al. ...... 73/862.324 |
| 5,852,413 A | * 12/1998 | Bacchi et al. .................. 341/13 |
| 5,886,352 A | 3/1999 | Wright et al. ........... 250/231.14 |
| 5,900,930 A | 5/1999 | Simon et al. ................ 356/138 |
| 5,969,344 A | 10/1999 | Tseng ..................... 250/231.13 |
| 5,990,473 A | 11/1999 | Dickey et al. .......... 250/231.13 |
| 6,031,222 A | 2/2000 | Carapelli ................ 250/231.13 |
| 6,111,645 A | 8/2000 | Tearney et al. ............. 356/354 |
| 6,389,910 B1 | * 5/2002 | Eisenhauer ............ 73/862.193 |
| 6,450,044 B1 | * 9/2002 | Eisenhauer et al. .... 73/862.193 |

FOREIGN PATENT DOCUMENTS

| CA | 962475 | 2/1975 |
| EP | 185619 | 2/1986 |
| EP | 0577104 | 1/1994 |
| EP | 0635700 | 1/1995 |
| WO | 91/19169 | 12/1991 |

OTHER PUBLICATIONS

Roger C. Palmer, The Bar Code Book, Third Edition, Helmers Publishing, Inc., Third Edition 1995, pp. 18–27, month unknown.

Patent Abstracts of Japan, P–451, p. 109, JP 60–243531, Dec. 3, 1985.

* cited by examiner

*Primary Examiner*—Que T. Le
(74) *Attorney, Agent, or Firm*—Arent Fox PLLC

(57) ABSTRACT

An angle sensor for sensing the absolute angular position of a rotatable body, such as a rotating shaft of an electric power steering system for an automobile, is disclosed.

7 Claims, 36 Drawing Sheets

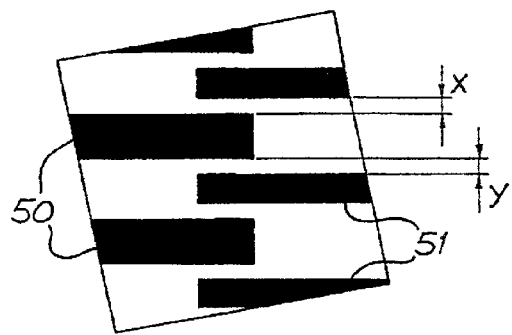
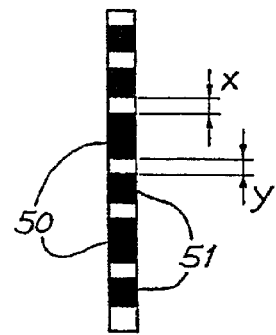
FIG. 21a  FIG. 21b
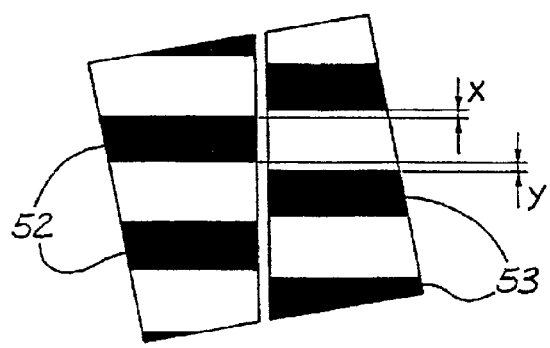
FIG. 22

SENSOR FOR SENSING ABSOLUTE ANGULAR POSITION OF A ROTATABLE BODY

This Application is a Continuation-In-Part of U.S. application Ser. No. 09/463,980, filed May 3, 2000, now U.S. Pat. No. 6,450,044 B1, which is a 371 of PCT/AU98/00645, filed Aug. 14, 1998; and is a Continuation-In-part of abandoned U.S. application Ser. No. 09/744,235, filed Apr. 11, 2001 now abandoned, which is a 371 of PCT/AU99/00590, filed Jul. 21, 1999.

TECHNICAL FIELD

This invention relates to an angle sensor for sensing the absolute angular position of a rotatable body, and in particular a rotating shaft such as found in electric power steering systems in vehicle applications.

BACKGROUND

Electric power steering systems conventionally incorporate an input shaft element, connected via an intermediate shaft and Hookes joint arrangement to the steering wheel. The input shaft therefore needs to rotate through an angle typically one to two revolutions either side of the on-centre steering position. The input shaft is at least partially surrounded by the fixed housing of the steering gear. It is a requirement of the electric power steering servo system to accurately measure the continuously varying torque in this rotating shaft. Conventionally torque applied to the shaft causes it to angularly deflect, such deflection causing one part of the shaft to angularly displace with respect to another part, and this displacement is sensed to provide a measurement of this torque.

The sensing means needs to allow for rotation of the shaft within the housing, usually employing non-contact or mechanical signal transmission means. Non-contact means include optical aperture based devices and magnetic devices such as magnetostrictive or variable reluctance couplings. Mechanical means include slidably connected potentiometers and other indicating devices.

To improve the accuracy of such sensing means a torsionally compliant coupling in the form of a torsion bar is used to connect the two input members at either end of the shaft. When torque is applied between the two input members the torsion bar deflects causing an increased angular displacement, which allows the use of less sensitive, or less accurate sensing means.

The torsion bar may be in the form of a separate element as in the case of a conventional rotary hydraulic power steering valve. Alternatively, in the case of some proposed electric power steering systems, the torsion bar may in fact be integral with the shaft member and be a relatively torsionally compliant (ie. less torsionally stiff) portion of the shaft member which couples substantially rigid torque input members at each end of the shaft member. The shaft member in these latter systems can be readily machined as a single steel component, and the only requirement is that the angular deflection of the relatively torsionally compliant coupling portion, connecting the two substantially rigid torque input member portions, has sufficiently low torsional stiffness that the sensing system is able to accurately measure its angular deflection.

Generally, the use of a torsion bar requires the use of a failsafe mechanism, being a torque limiting device to prevent failure of the torsion bar when unavoidable torque overload conditions occur.

Such torque limiting devices are well known in the art of vehicle steering, and will therefore not be described in this specification.

The prior art, which is most closely related to that of the present invention, is described in U.S. Pat. No. 5,369,583 and International Patent Application PCT/GB95/02017 which show sensors employing optical disc apertures for measuring torque.

It is also desirable that the angular position of the shaft member be measurable through a range of 360 deg, that is +/−180 deg from some known absolute position.

The essence of the present invention resides in the provision of a grating element on the shaft member comprising a surface composed of alternating regions of high and low reflectivity. This surface is illuminated by a source of electro-magnetic radiation (EMR), typically UV, visible or IR light, which generates patterns on one or more arrays of detectors sensitive to the EMR. Arrays include CCD devices, VLSI vision chips, one and 2 dimensional photo-detector arrays and lateral effect photodiodes (commonly referred to as PSD's or position sensitive devices). The output of the one or more arrays can be processed to produce a measure of the absolute angular position the shaft member. It is distinguished from other angle sensors by use of an reflective imaging approach which does not rely on Moire fringes, speckle patterns or other diffraction gratings. As it uses photo detector arrays, EMR reflected from the gratings provide an instantaneous image which allows a much faster and more complete means of interpreting the information than is possible with individual photo-detectors. In the latter case it is necessary to count successive changes of EMR intensity incident on the photo-detector, which is slower and more prone to error.

Another reflective torque transducer that uses arrays is described in U.S. Pat. No. 5,490,430. This relies on a change in diffraction angle of two or more diffraction gratings that are torsionally strained by the application of torque. This device is prone to error due to misalignment and bending load and requires a collimated and monochromatic source of EMR. The regions of high and low reflectivity can be arranged axially or radially about the axis of rotation of the shaft, and are of such a nature that allows a continuous output of the arrays at any instant in time regardless of the angular position of the shaft, as the limited array dimensions may not allow the complete circumference or radial face to be viewed by the arrays. The advantages of such a construction over that disclosed in U.S. Pat. No. 5,369,583 and International Application Number PCT/GB95/02017 may arise as one or more of the following:

Firstly, the use of reflective grating elements allows simpler and more compact construction by the use of a cylindrical grating element arrangement, which is not readily achievable using disc apertures as shown in the prior art without requiring a significantly increased diameter. It also allows the EMR source(s) and array(s) to be packaged in the same assembly with further savings in space and cost. Secondly, it allows for easy assembly and disassembly of the transducer, as the grating elements can be removed from one end of the transducer in an axial direction without disturbing the EMR source(s) or array(s).

Thirdly, another advantage with the use of reflective grating elements is that the EMR is reflected from the surface, and is not affected by edge scattering as is the case with apertures with a non-zero thickness. Such scattering limits the maximum resolution of the device. Fourthly, the use of reflective grating elements allows the use of well known and accurate photographic or metallising techniques, for example metal on glass. The use of these techniques with apertures may result in loss of resolution or other problems from internal reflection, diffraction or degradation over time as the EMR has to travel through the glass between the metallised regions.

Finally, the use of reflective grating elements allow the use of intermeshed castellations which can provide a lost motion connection limiting the maximum angular deflection of the torsion bar, thereby eliminating the need for a separate torque limiting device and reducing the cost and complexity of the transducer.

DISCLOSURE OF INVENTION

An angular position sensor comprising at least one body at least partially surrounded by a housing, the body rotatable about an axis of rotation fixed with respect to the housing, the body having a grating element attached thereto or integral therewith, the grating element comprising a surface of revolution about the axis of rotation, the surface comprising regions of high and low EMR reflectivity, the sensor also comprising at least one EMR source and at least one array of EMR sensitive detectors, the source irradiating the surface and the array receiving incident EMR reflected from the surface, the source and the array fixed with respect to the housing, a pattern thereby produced by incident EMR on the array at any instant of time resulting from the alternating regions of low and high reflectivity on the surface of the grating element, regardless of the angular position of the body, the output from the at least one array resulting from the pattern on the at least one array at said any instant of time is processed by a processor to derive the absolute angular position of the regions with respect to the housing, and hence provide a measure of the absolute angular position of the rotatable body with respect to the housing.

Preferably the at least one body comprises two rotatable bodies each of which has a respective grating element, the two bodies connected by a member of predetermined torsional stiffness, and at the at least one array of EMR sensitive detectors receiving the incident EMR reflected from the surfaces of the grating elements, the pattern or patterns processed to derive the absolute angular position of the regions on the surfaces of the grating elements with respect to the housing, and the difference between the angular positions further processed to derive the relative angular displacement of the grating elements, and hence provide a measure of the torque transmitted by the member.

Preferably the at least one array of EMR sensitive detectors is two arrays of EMR sensitive detectors, each of which is associated with a respective grating element.

Preferably the at least one EMR source is two EMR sources, each of which is associated with a respective grating element.

Preferably the surface of revolution is at least partially cylindrical.

Preferably the regions of high and low EMR reflectivity are a pseudo random distribution of regions arranged in the form of an endless succession of individual binary bar codes.

Preferably the body is a rotating shaft in a vehicle power steering system.

BRIEF DESCRIPTION OF DRAWINGS

The present invention will now be described by way of example with reference to the accompanying drawings, in which:

FIG. 21a shows a typical pattern produced on the single array according to the second embodiment of the present invention, where this array is a two dimensional array, FIG. 21b shows a typical pattern produced on the single array according to the second embodiment of the present invention, where this array is a one dimensional array, FIG. 22 shows a typical pattern produced on the single two dimensional array according to the third embodiment of the present invention.

MODE OF CARRYING OUT INVENTION

Figure 1:
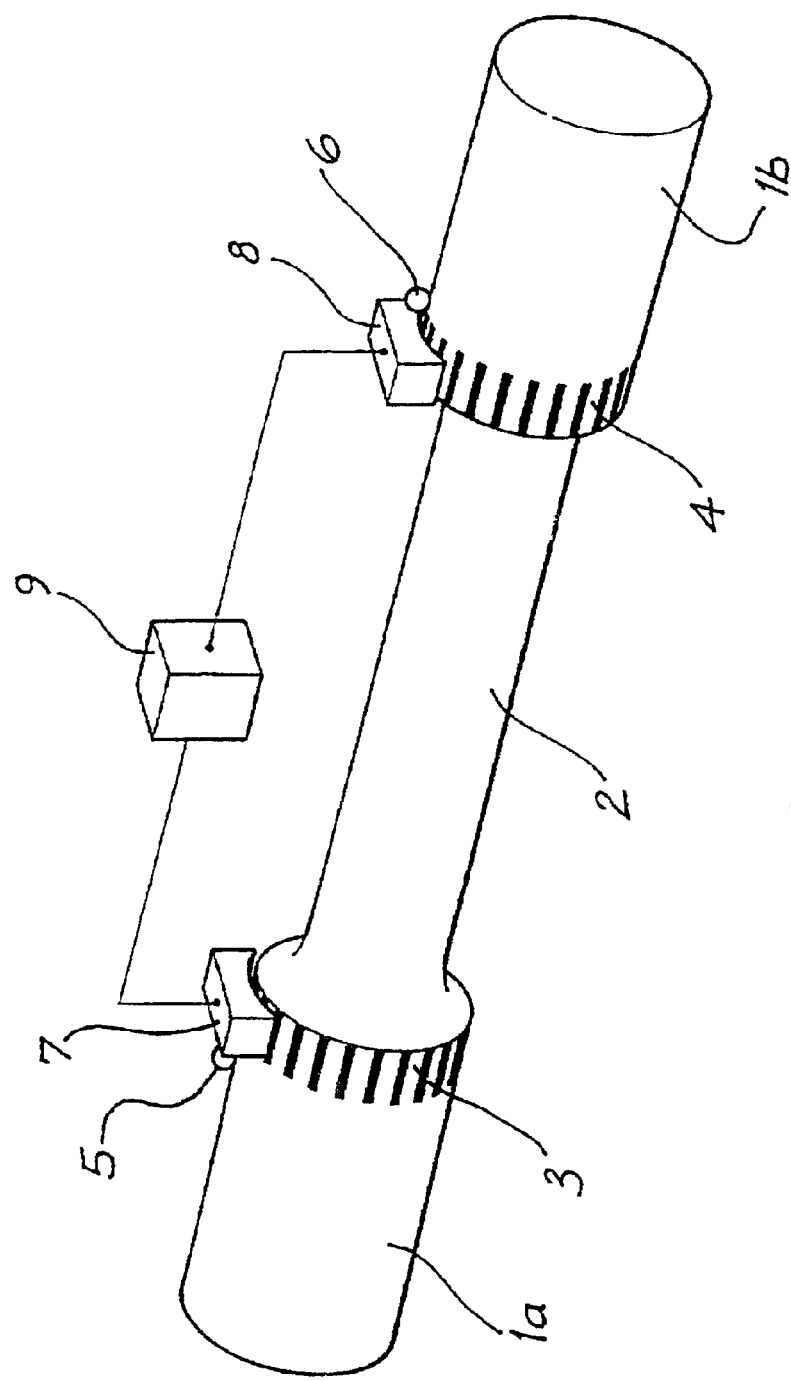
FIG. 1 is a diagrammatic view of two torque input members connected by a torsion bar, showing the regions of high and low reflectivity on the surfaces of the grating elements and the associated two arrays.

FIG. 1 shows grating elements 3 and 4 attached to torque input members 1a and 1b of the shaft at either end of a torsionally compliant coupling in the form of torsion bar 2.

Grating elements 3 and 4 comprise surfaces composed of alternating regions of high and low reflectivity. Electromagnetic radiation (EMR) sources 5 and 6 are disposed to illuminate the surfaces. Arrays 7 and 8 of EMR sensitive detectors receive incident EMR reflected from the surfaces and the patterns thus generated on arrays 7 and 8 are processed by processor 9.

Figure 2:
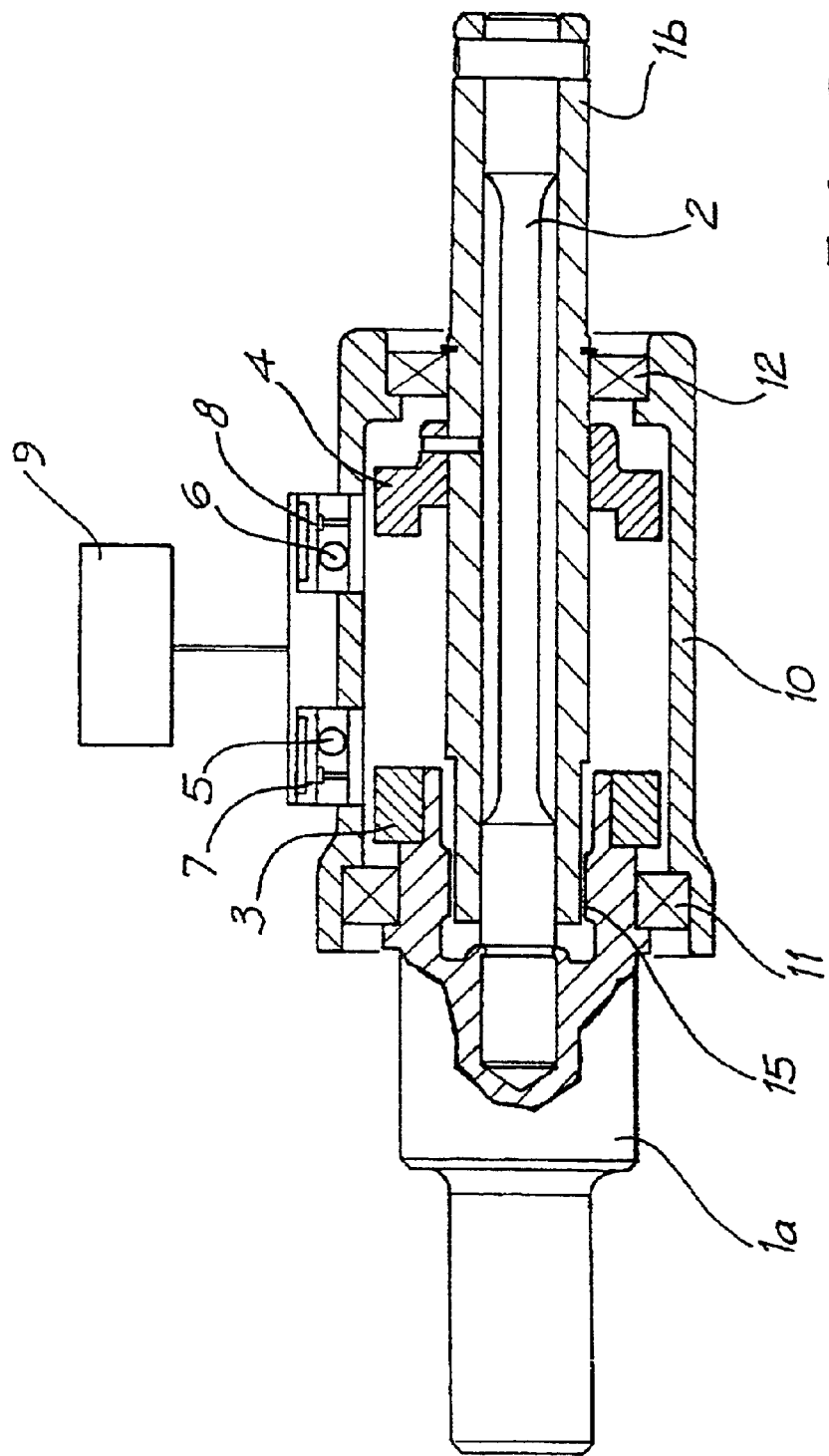
FIG. 2 is a cross section of torque transducer according to a first embodiment of the present invention based on the concept shown in FIG. 1.

FIG. 2 shows a cross section of a torque transducer according to a first embodiment of the present invention, using the principles shown in FIG. 1. Cylindrical grating elements 3 and 4, comprising surfaces composed of alternating high and low reflectivity, are attached to torque input members 1a and 1b which are connected to either end of the torsion bar 2. In other (not shown) embodiments either (or both) grating elements may be integral with their respective torque input members. The assembly is enclosed in housing 10 and supported by bearings 11 and 12. EMR sources 5 and 6 are disposed to illuminate the surfaces. Arrays 7 and 8 of detectors receive incident EMR from the surfaces and the patterns thus generated on the arrays are processed by a processor 9 to provide a measurement of torque. When torque is applied between torque input members 1a and 1b torsion bar 2 angularly deflects, resulting in a displacement of one pattern with respect to the other. Failsafe mechanism 15 limits the maximum torque carried by the torsion bar 2 by providing a limit to the amount of angular deflection of torque input member 1b with respect to torque input member 1b. Such a failsafe mechanism is well known in the art of power steering.

Figure 3:
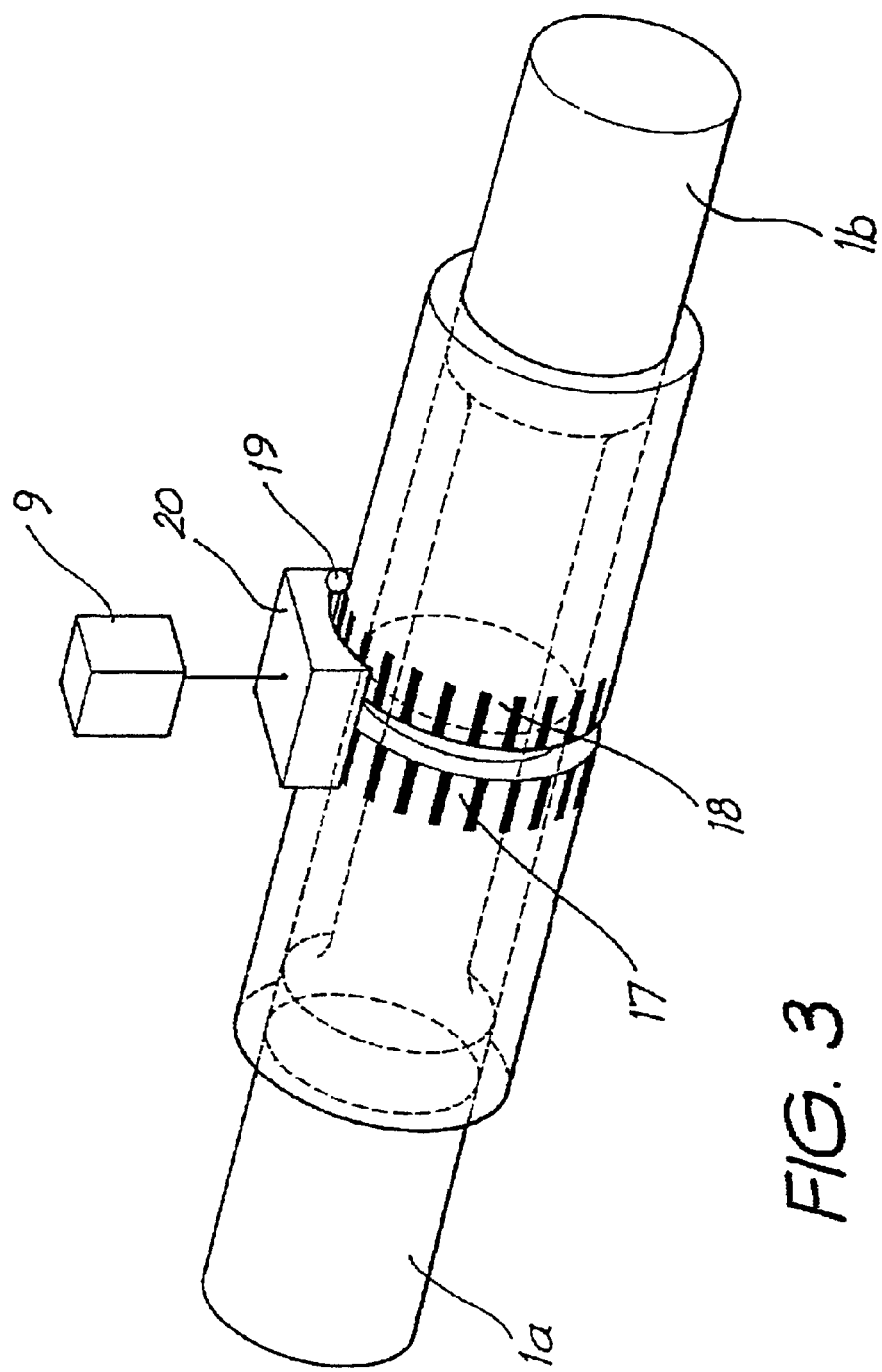
FIG. 3 is a diagrammatic view of two torque input members connected by a torsion bar, showing the regions of high and low reflectivity on the surfaces of the adjacent grating elements and the associated single array.

FIG. 3 shows another embodiment. Cylindrical grating elements 17 and 18, each comprising a continuous cylindrical surface composed of substantially axially aligned regions of alternating high and low reflectivity, are attached to torque input members 1a and 1b respectively which are in turn connected to either end of the torsion bar 2. Grating elements 17 and 18 are arranged such that they are adjacent. EMR source 19 is arranged to illuminate both surfaces, and the array 20 of detectors receives incident EMR from both surfaces and the pattern thus generated on the array is processed by the processor 9 to provide a measurement of torque.

Figure 4:
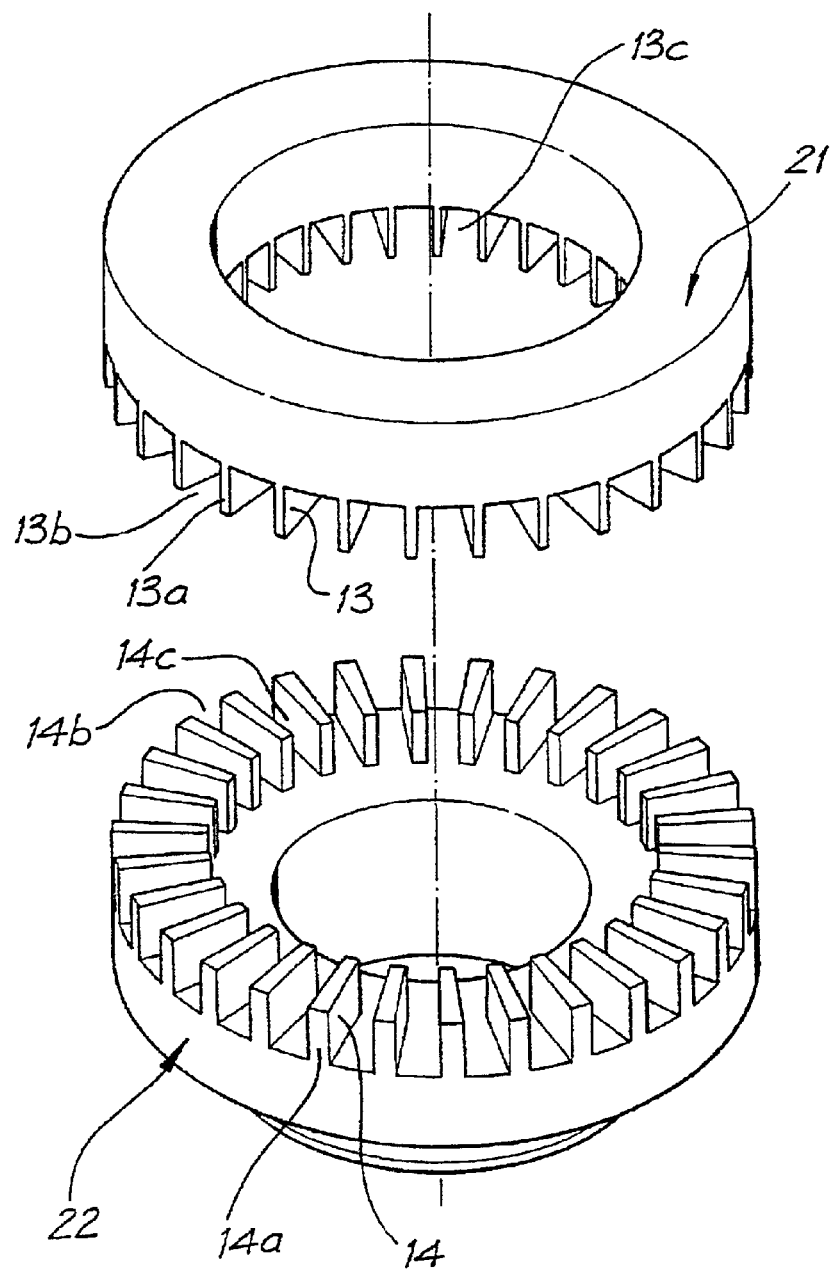
FIG. 4 is an exploded isometric view of an interdigital arrangement of two grating elements comprising castellations.
Figure 5:
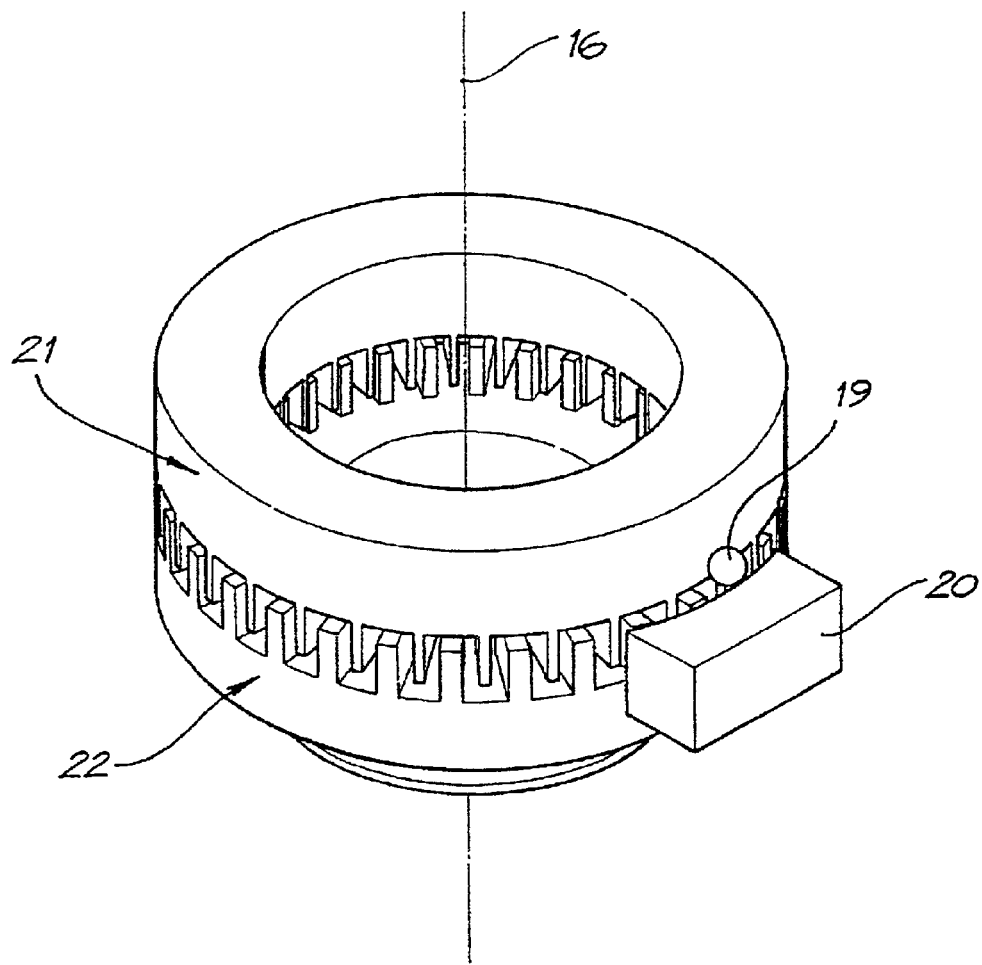
FIG. 5 is another view of FIG. 4 showing the actual relationship of the two grating elements and the associated single array.
Figure 6:
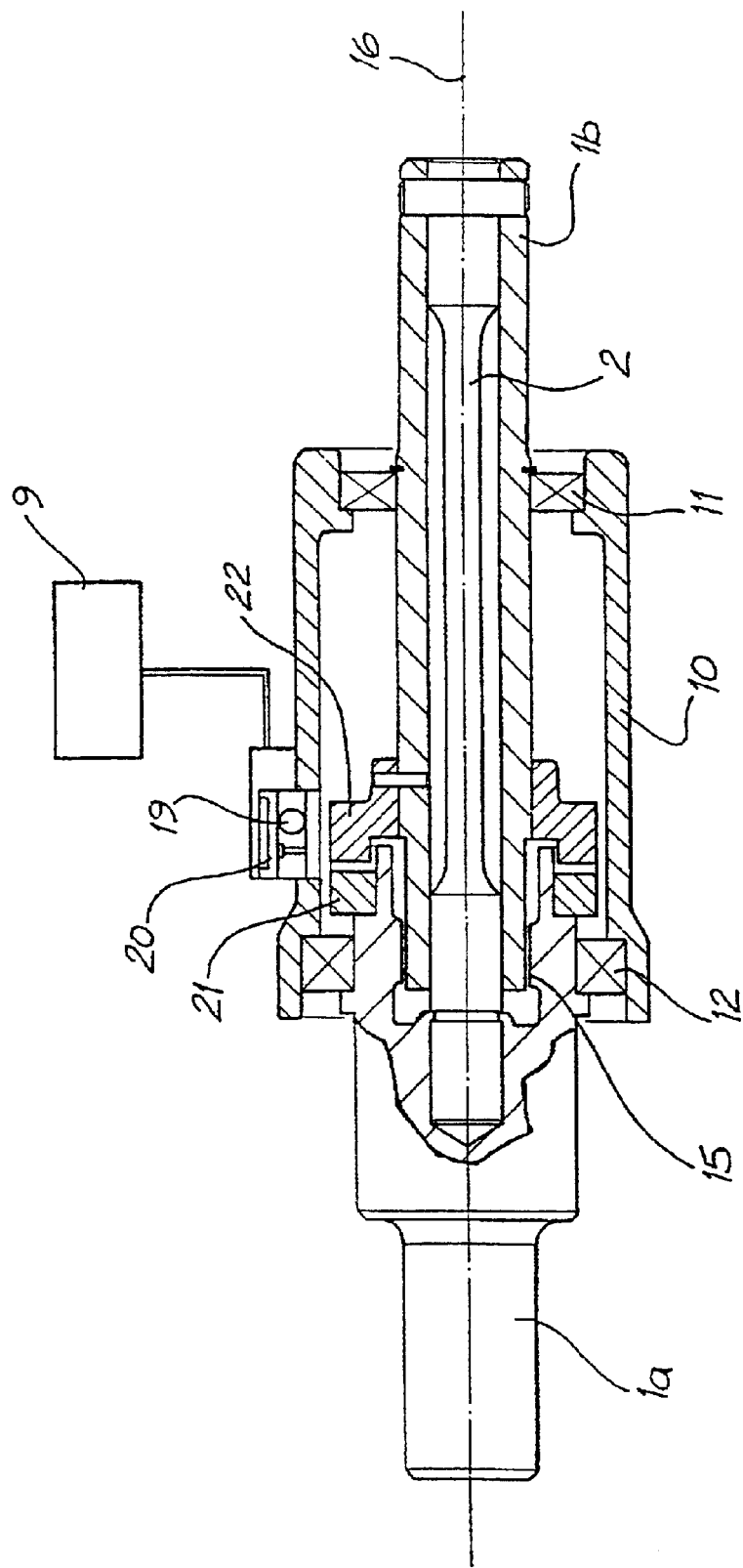
FIG. 6 is cross section of a torque transducer according to a second embodiment of the present invention, based on the concept shown in FIGS. 4 and 5.

FIGS. 4, 5 and 6 shows a second embodiment of the present invention. Cylindrical grating elements 21 and 22 are attached to torque input members 1a and 1b, connected to either end of the torsion bar 2. The outer cylindrical surfaces of grating elements 21 and 22 are discontinuous and are formed in part by substantially axially aligned, radially protruding castellations 13 and 14 respectively. The regions of high reflectivity correspond to the areas of maximum radius of the castellations with respect to their mutual central axis 16, that is outer peripheral areas 13a and 14a respectively, and may be smoothly machined, moulded or sintered, or surface treated with paint or material deposition to impart the required high reflectivity. The regions of low reflectivity are angularly aligned with the discontinuous gap areas of the outer cylindrical surfaces of grating elements 21 and 22, namely areas 13b and 14b respectively and, in the embodiment shown here, are substantially non-reflective due to the presence of fully-radially-extending (ie. full depth) cavities 13c and 14c between adjacent castellations 13 and 14 on each grating element 21 and 22 respectively. In other embodiments (not shown) the cavities may be alternatively truncated at a lesser radius than the aforementioned maximum radius, such resulting surface of lesser radius ideally being machined, moulded or sintered, or surface treated with paint or material deposition to impart low reflectivity. Grating elements 21 and 22 are interdigitally arranged as shown in FIG. 5. This assembly is enclosed in housing 10 and supported by bearings 11 and 12. An EMR source 19 is arranged to illuminate the surfaces, and array 20 of detectors receives incident EMR reflected from the regions of high reflectivity 13a and 14a on the outer cylindrical surfaces of grating elements 21 and 22 respectively. The pattern thus generated on array 19, comprising therefore interdigitally disposed subpatterns generated by incident EMR reflected from regions 13a and 14a respectively, is processed by the processor 9 to provide a measurement of torque.

Figure 7:
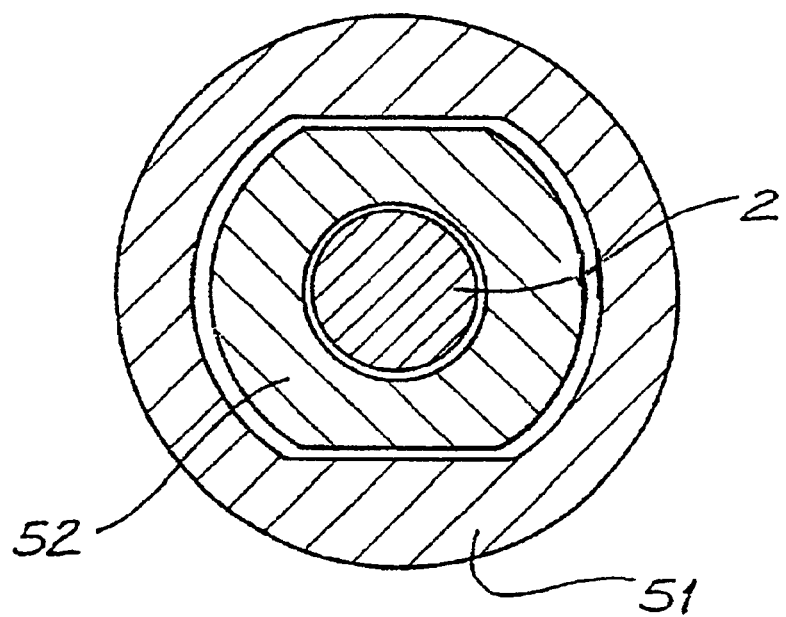
FIG. 7 is a cross section of the failsafe mechanism in the embodiments shown in FIGS. 2, 6, 8, 11, 12 and 16.

Failsafe mechanism 15, shown in cross section in FIG. 7, limits the maximum torque carried by torsion bar 2 by providing a maximum limit to its angular deflection. Referring back to FIG. 2, element 51 is a feature of torque input member 1a and element 52 is a feature of torque input member 1b, and interact to limit the maximum angular deflection of torsion bar 2. When the torque applied to torsion bar 2 reaches a predetermined maximum value elements 51 and 52 contact rotationally, providing an alternate torsional load path to torsion bar 2.

Figure 8:
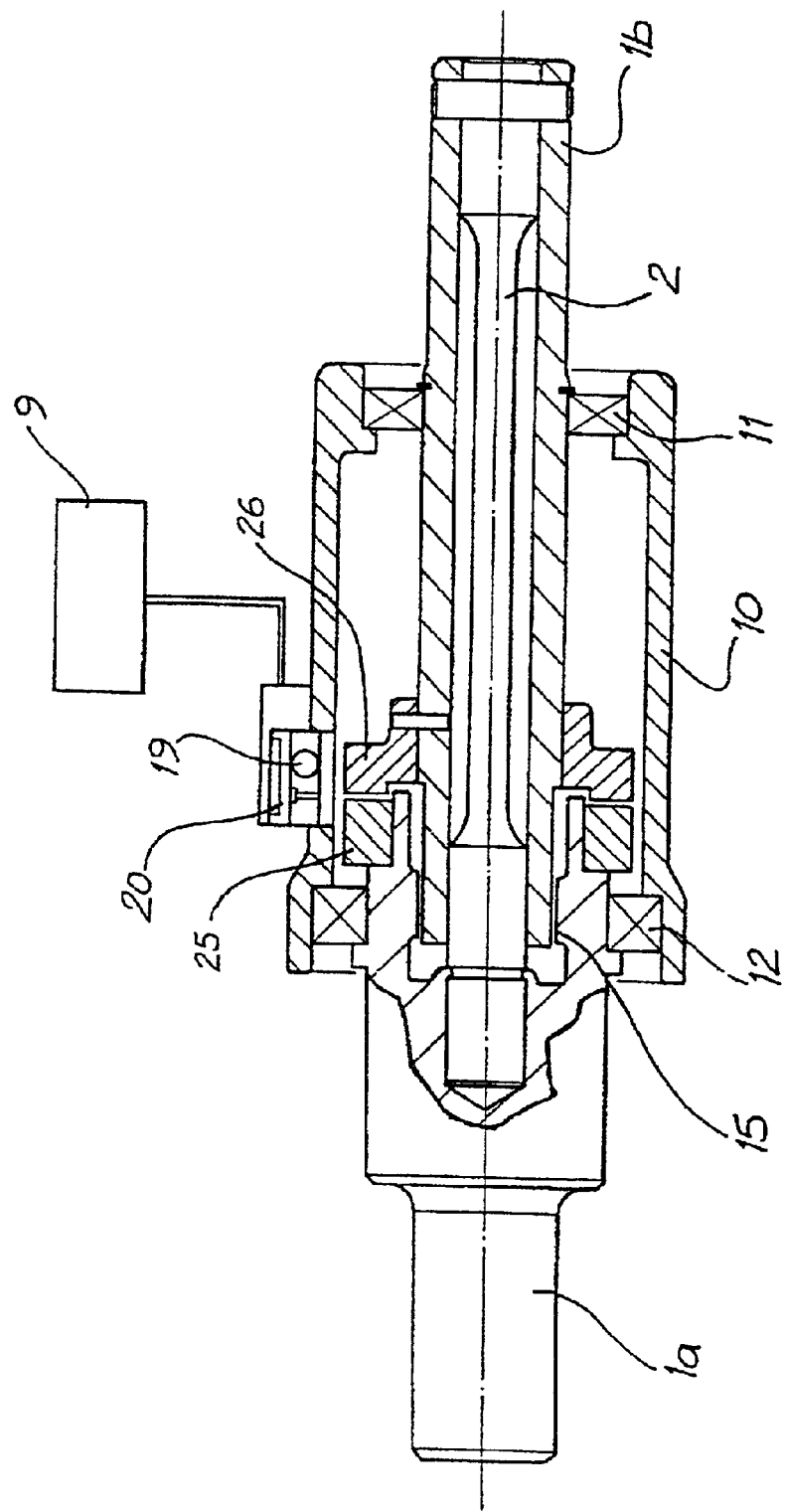
FIG. 8 is a cross section of a torque transducer according to a third embodiment of the present invention, utilising grating elements comprising substantially smooth cylindrical surfaces.
Figure 9:
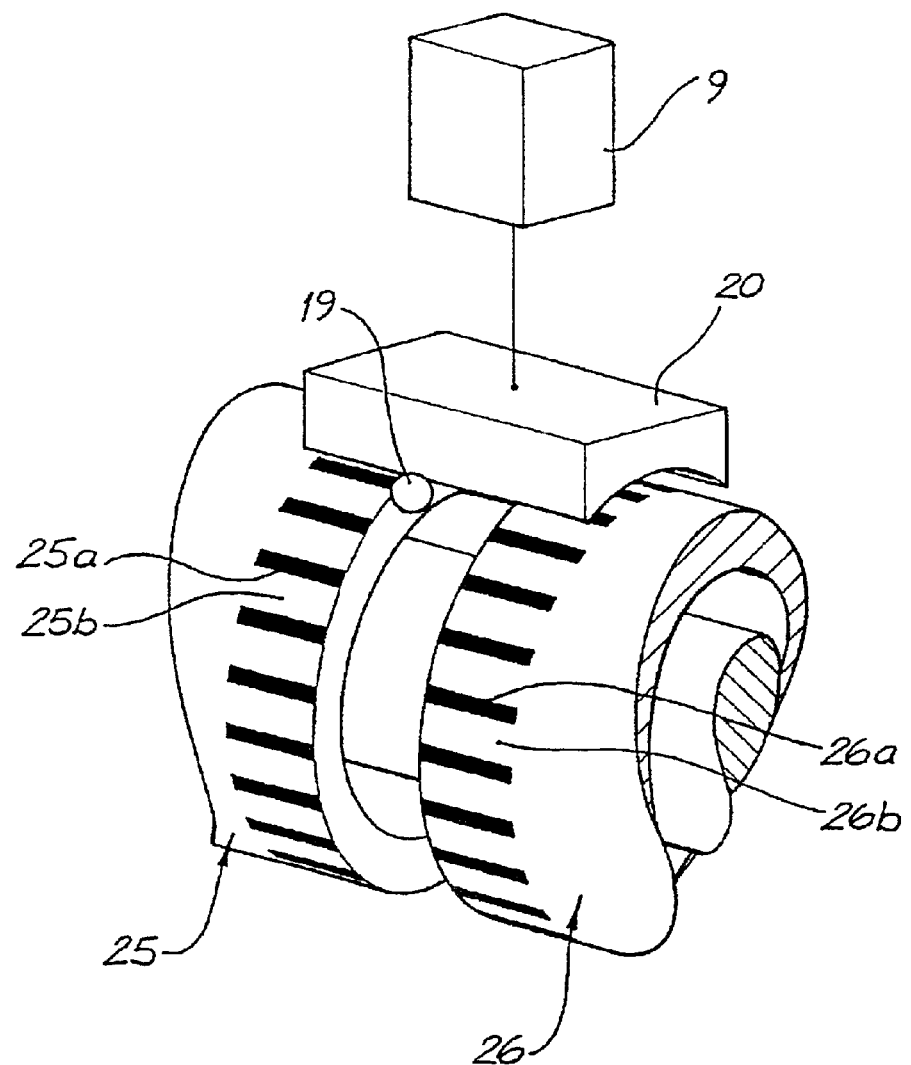
FIG. 9 shows details of the grating elements of the torque transducer shown in FIG. 8.

FIGS. 8 and 9 show a third embodiment of the present invention. Cylindrical grating elements 25 and 26, each comprising a substantially smooth cylindrical surface with alternating regions of high and low reflectivity, are respectively attached to torque input members 1a and 1b, which in turn are connected to either end of torsion bar 2. This assembly is enclosed in housing 10 and supported by bearings 11 and 12. A metallised coating, or other shiny or light coloured material or surface treatment, provides substantially axially aligned regions of high reflectivity 25a and 26a. A substantially transparent, roughened or dark coloured material or surface treatment provides the interspaced regions of low reflectivity 25b and 26b. EMR source 19 is arranged to illuminate both surfaces, and the array 20 of detectors receives incident EMR from the surfaces and the pattern thus generated on the array is processed by processor 9 to provide a measurement of torque. Failsafe mechanism 15, shown in cross section in FIG. 7, limits the maximum torque carried by the torsion bar 2 as described earlier.

Figure 10:
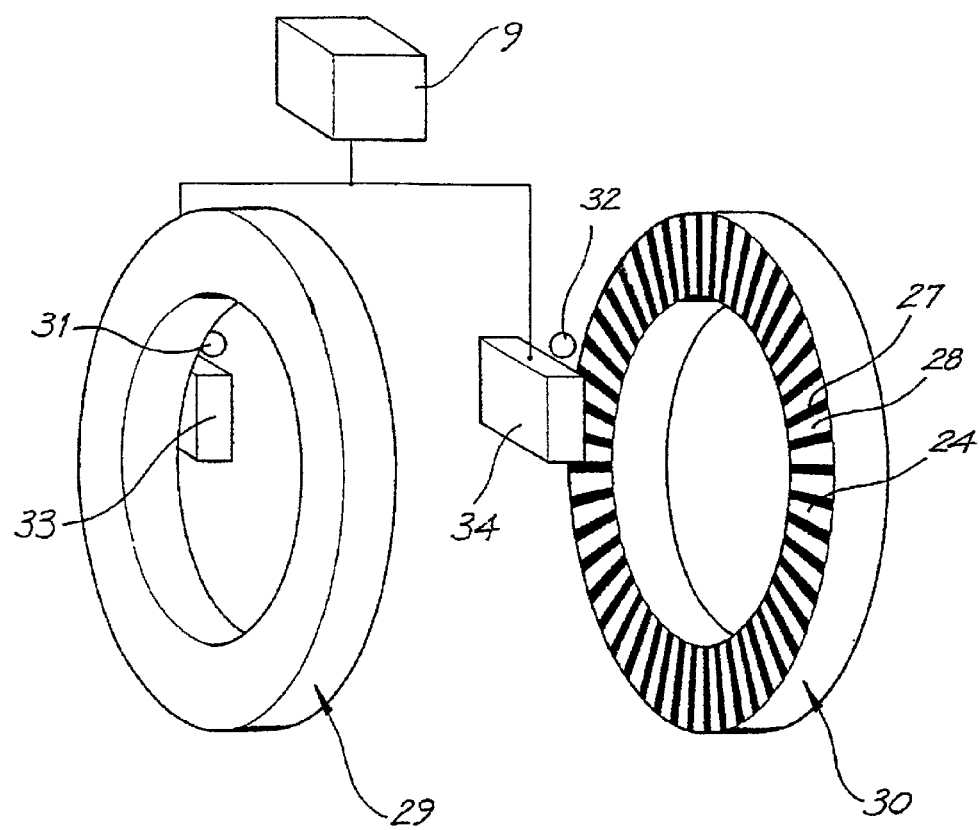
FIG. 10 is a diagrammatic view similar to FIG. 1 but showing grating elements with radially disposed surfaces.
Figure 11:
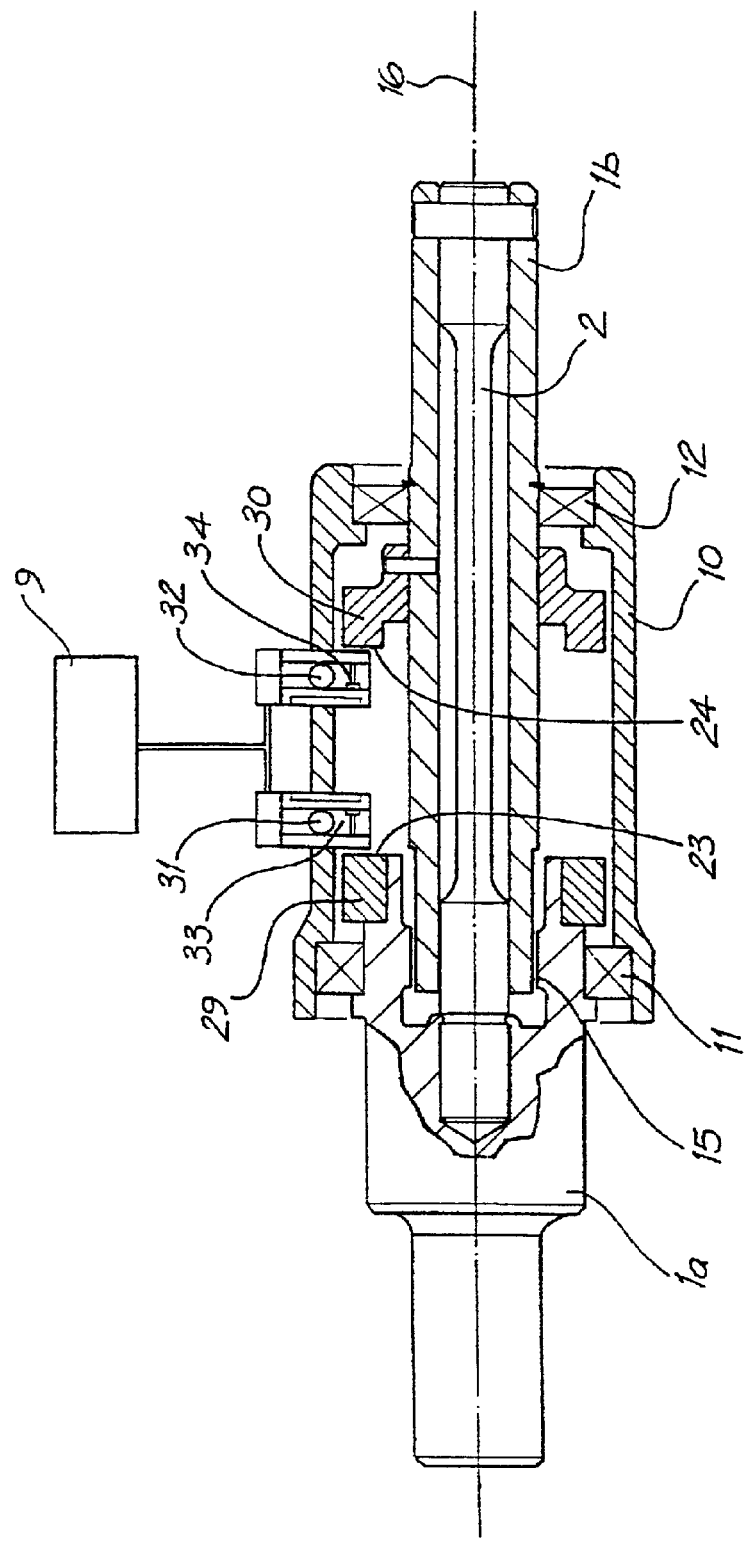
FIG. 11 is a cross section of torque transducer according to a fourth embodiment of the present invention, based on the concept shown in FIG. 10.

FIGS. 10 and 11 show a fourth embodiment of the present invention. Grating elements 29 and 30, again respectively attached to torque input members 1b and 1a, incorporate continuous, radially disposed surfaces 23 and 24. These radially disposed surfaces are arranged perpendicular to, and have a mutual central axis collinear with, axis of rotation 16. Each surface comprises substantially radially disposed alternating regions of high and low reflectivity 27 and 28 respectively. Grating elements 29 and 30 are surrounded by housing 10 and the assembly carried in bearings 11 and 12. EMR sources 31 and 32 are disposed to illuminate the surfaces. Arrays 33 and 34 of detectors receive incident EMR from the surfaces and the patterns thus generated on the arrays are processed by processor 9. When torque is applied between torque input members 1a and 1b, torsion bar 2 angularly deflects, resulting in a displacement of one pattern with respect to the other. Failsafe mechanism 15, shown in cross section in FIG. 7, limits the maximum torque carried by the torsion bar 2 as described earlier.

Figure 12:
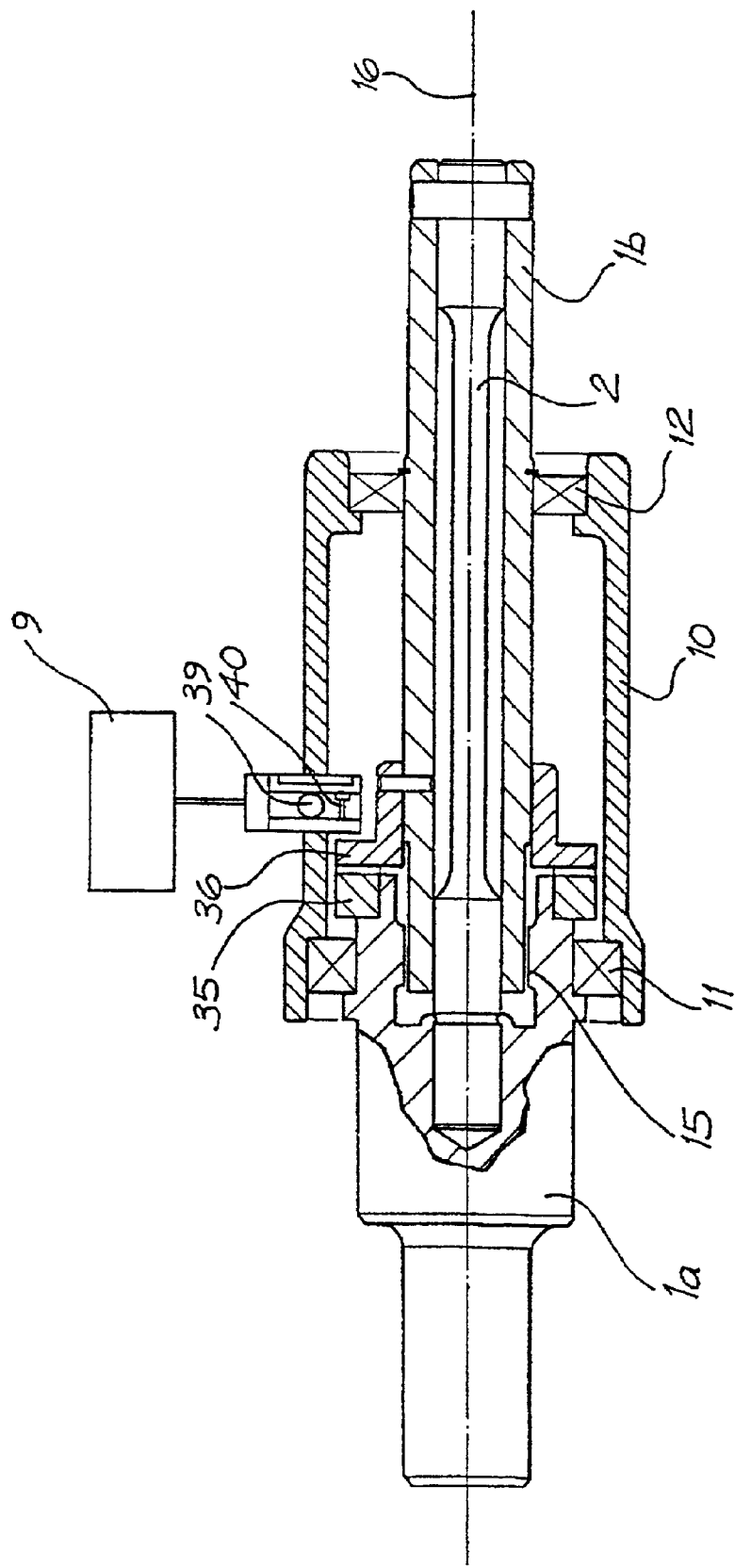
FIG. 12 is a cross section of a torque transducer according to a fifth embodiment of the present invention employing axially protruding, rather than radially protruding, castellations.
Figure 13:
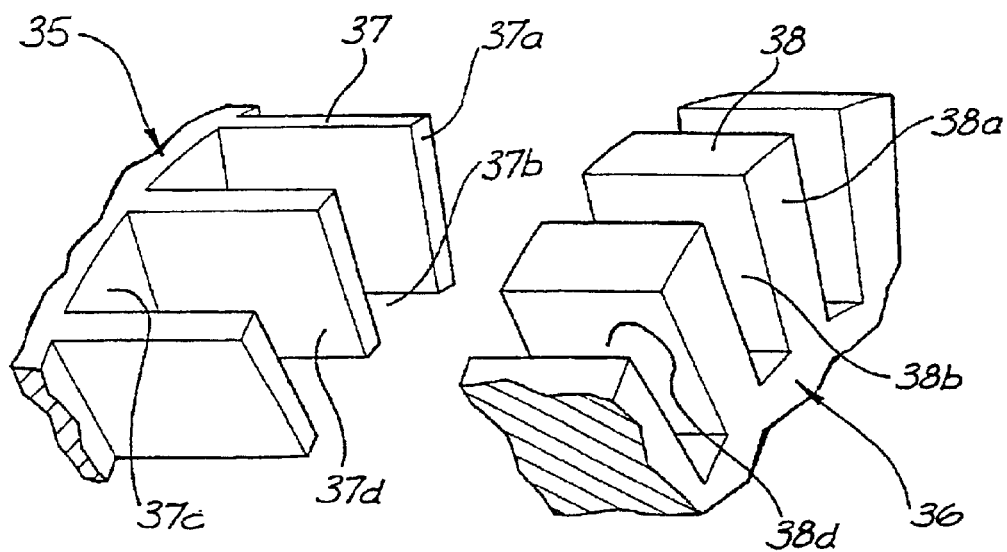
FIGS. 13 and 14 show exploded and assembled isometric views respectively of the axially protruding interdigital castellations shown on FIG. 12.
Figure 14:
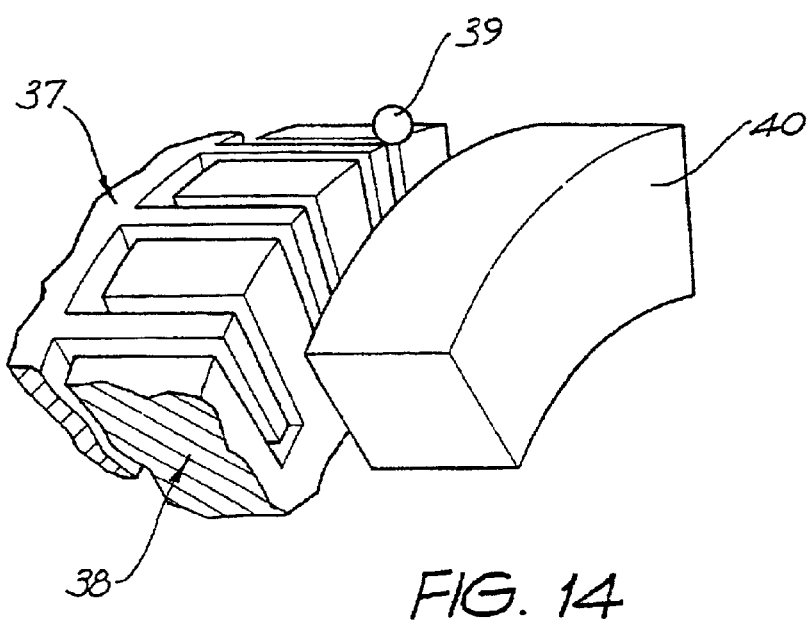

FIGS. 12, 13 and 14 show a fifth embodiment of the present invention. Grating elements 35 and 36 comprise radially disposed surfaces arranged perpendicular to, and having a mutual central axis collinear with, axis of rotation 16. The surfaces are formed by axially protruding castellations 37 and 38 respectively, the regions of high reflectivity provided by the areas of maximum axial protrusion 37a and 38a of castellations 37 and 38, and the regions of low reflectivity angularly aligned with the discontinuous gap areas 37b and 38b between the castellations. The root areas 37c and sides 37d of castellations 37, and also the sides 38d of castellations 38, have lesser axial protrusion than regions 37a and 38a and are machined, moulded or sintered, or surface treated with paint or material deposition to impart low reflectivity. The grating elements are interdigitally meshed as shown in FIG. 14. This assembly is enclosed in housing 10 and supported by bearings 11 and 12. An EMR source 39 is arranged to illuminate the surfaces, and an array 40 of detectors receives incident EMR reflected from the surfaces. The pattern thus generated on array 19, therefore comprising interdigitally disposed subpatterns generated by incident EMR reflected from regions 37a and 38a respectively, is processed by the processor 9 to provide a measurement of torque. Failsafe mechanism 15, shown in cross section in FIG. 7, limits the maximum torque carried by the torsion bar 2 as described earlier.

Figure 15:
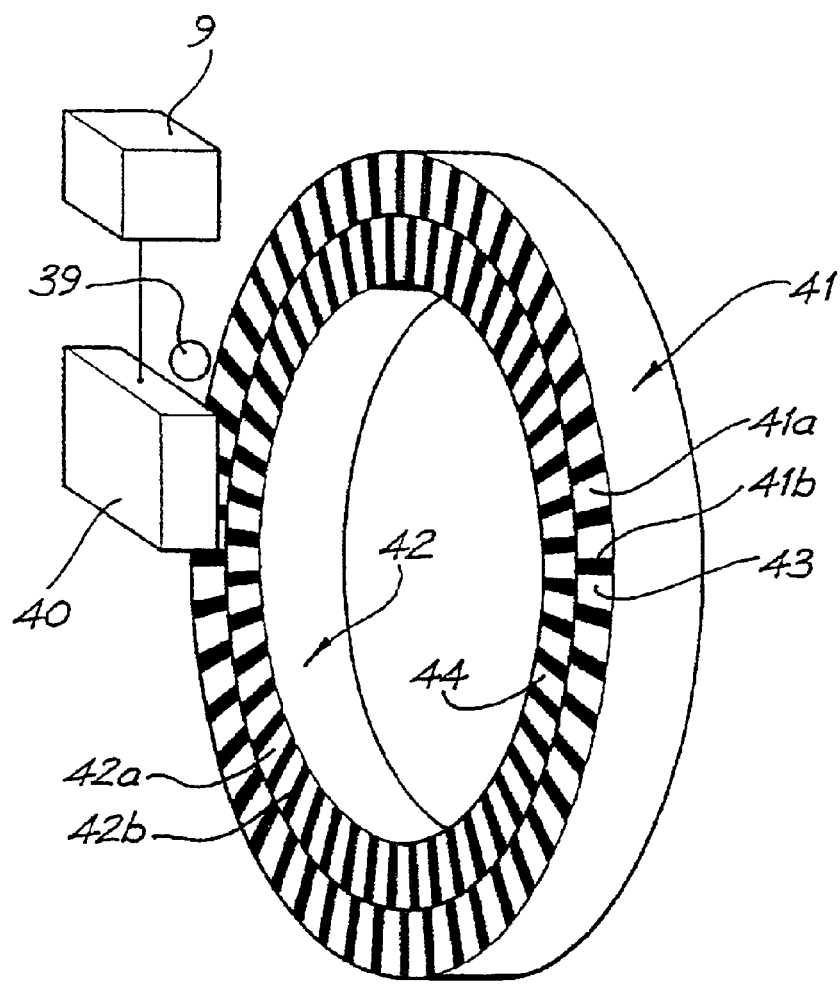
FIG. 15 is a diagrammatic view of two input torque members and attached grating elements with radially disposed surfaces.
Figure 16:
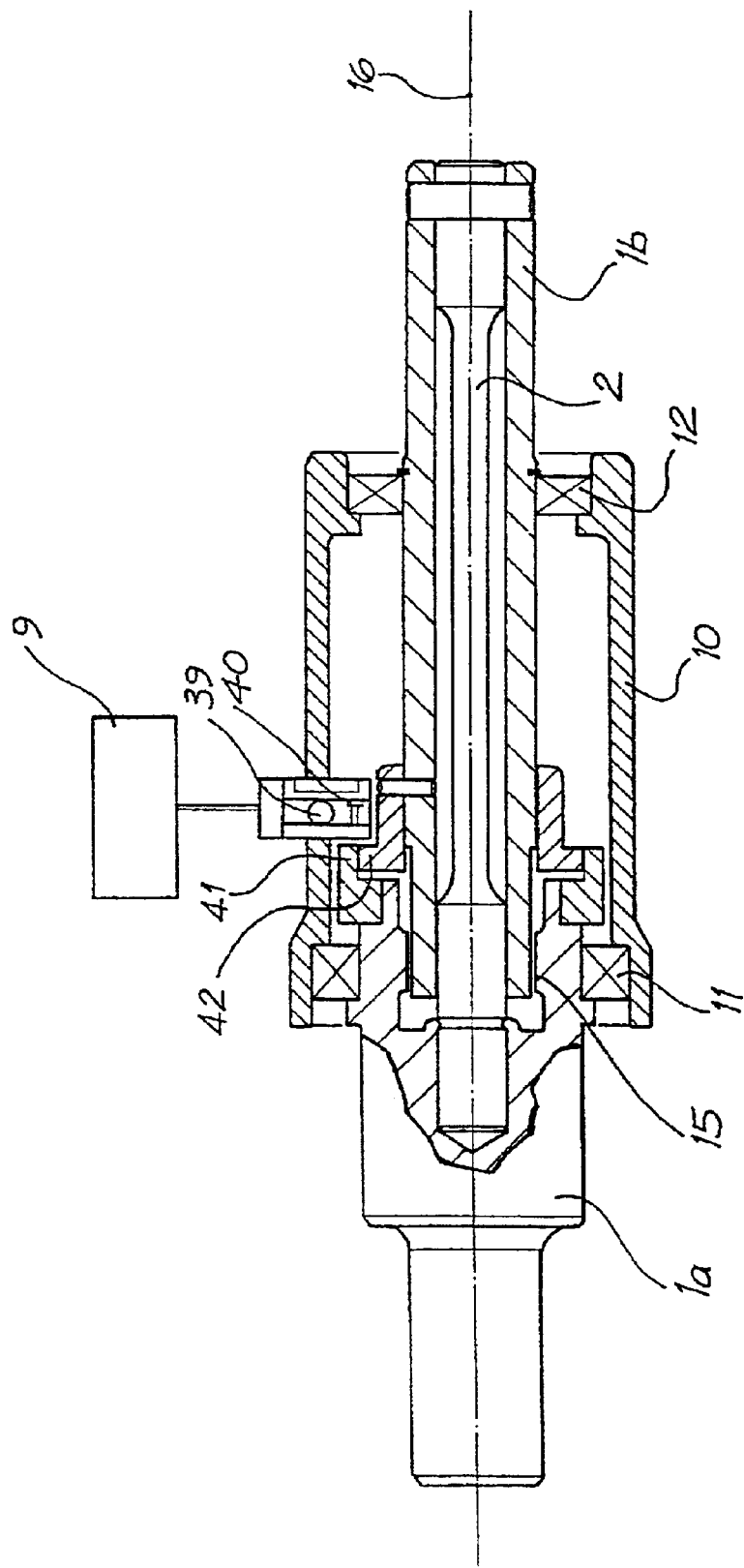
FIG. 16 is a cross section of a torque transducer according to a sixth embodiment of the present invention, based on the concept shown in FIG. 15, FIGS. 17 and 18 show exploded and assembled perspective views respectively of interdigitally meshed grating elements comprising castellations which also provide a failsafe mechanism.

FIGS. 15 and 16 show a sixth embodiment of the present invention. Grating elements 41 and 42, again attached to torque input members 1b and 1a respectively, incorporate continuous radially disposed surfaces 43 and 44. These radially disposed surfaces are substantially coplanar and concentric with respect to axis of rotation 16. Each surface is smooth and incorporates substantially radially disposed alternating regions of high and low reflectivity. A metallised coating, or other shiny or light coloured material or surface treatment, provides the regions of high reflectivity 41a and 42a. A substantially transparent, roughened or dark coloured material or surface treatment provides the regions of low reflectivity 41b and 42b. EMR source 39, array 40 of detectors and processor 9 are used to generate a measurement of torque.

Figure 17:
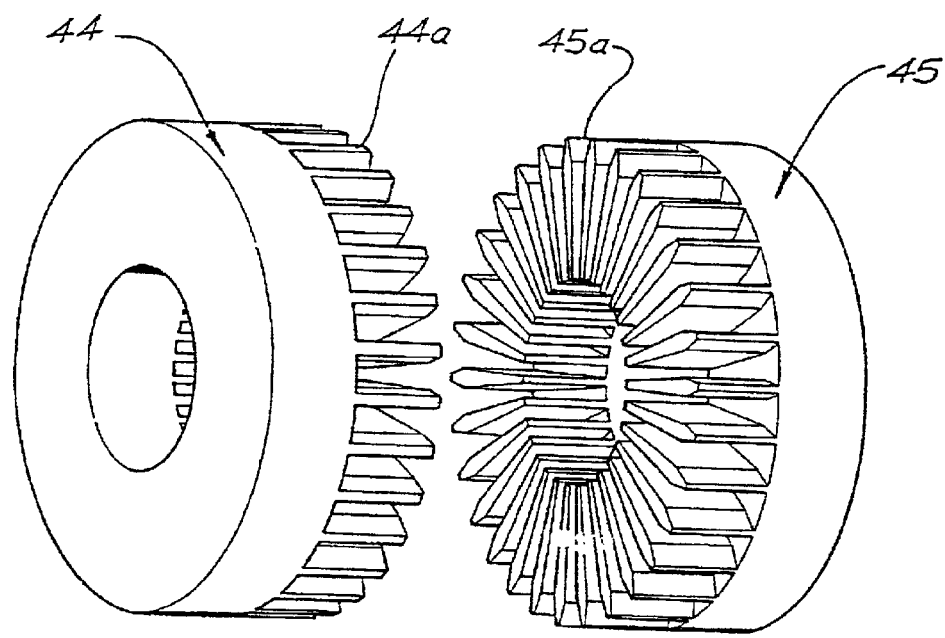
Figure 18:
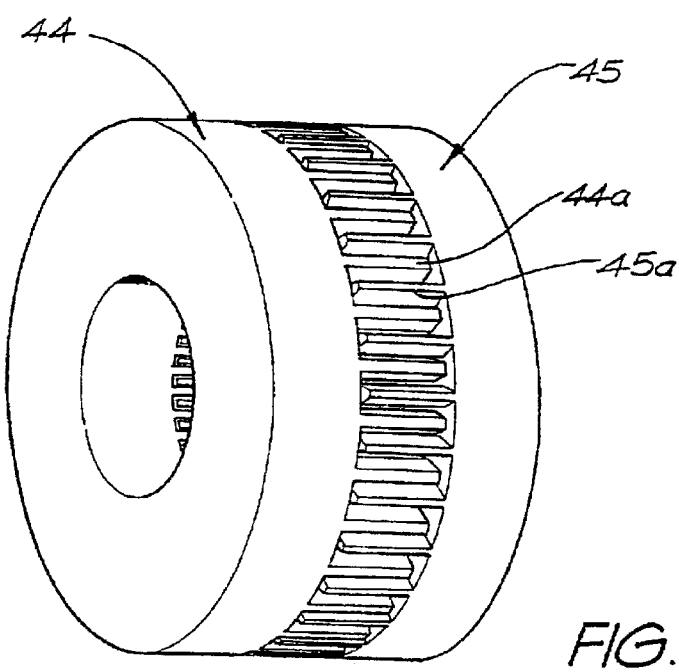

FIGS. 17 and 18 show an alternative version of the second embodiment of the present invention (refer back to FIGS. 4, 5 and 6). Two grating elements 44 and 45 are adjacent and comprise radially extending intermeshing castellations 44a and 45a which provide a measurement of torque similar to that described in reference to grating elements 21 and 22 of the second embodiment. The clearance provided between castellations 44a and 45a provides a rotational lost motion connection between the first and second torque input members and hence limits the maximum angular deflection of torsion bar 2. When the torque applied between torque input members 1a and 1b reaches a predetermined maximum value in either direction, castellations 44a and 45a contact, providing an alternate torsional load path to the torsion bar 2, thus allowing elimination of failsafe mechanism 15 by providing the same function.

Figure 19:
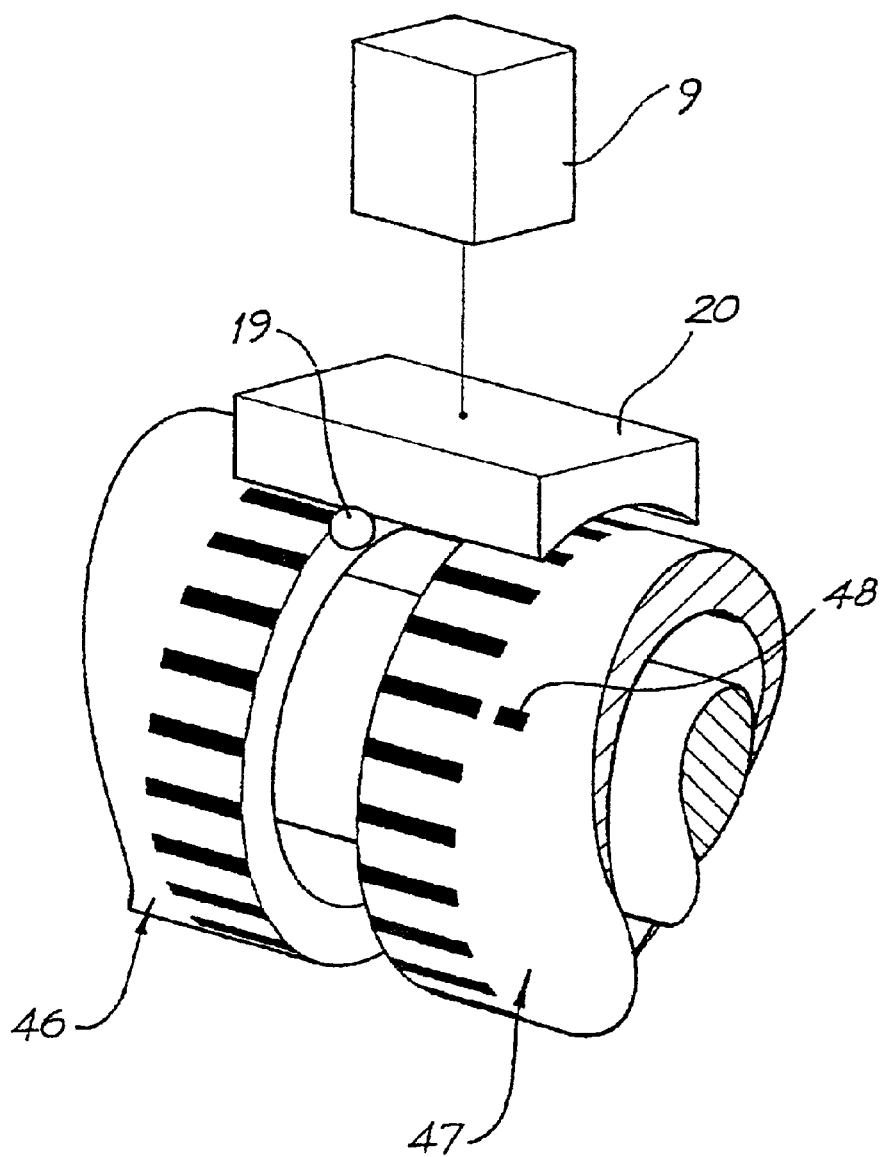
FIG. 19 shows an alternative version of the third embodiment of the present invention allowing also the measurement of absolute angular position of one of the torque input members.

FIG. 19 shows an alternative version of the third embodiment of the present invention (refer back to FIGS. 8 and 9), however it should be noted that this same concept could be readily applied to any of the embodiments disclosed in this specification. Two grating elements 46 and 47 comprise cylindrical surfaces composed of alternating regions of high and low reflectivity, similar to those as shown in FIGS. 8 and 9. In addition to these regions, at least one additional "home mark" region 48 (or, alternatively not shown, an axially lengthened existing region) of high or low reflectivity is added to one of the surfaces at a predetermined angular position. EMR source 19 is arranged to illuminate both surfaces, and array 20 of detectors receives incident EMR from the surfaces and the patterns thus generated on the array is processed by the processor 9 to provide a measurement of torque and also absolute angular position of the torque input member to which the relevant grating element is attached to or integral with.

FIGS. 20–25 show typical patterns produced by incident EMR on the various array combinations according to the present invention. Note that, for illustration in all these figures, the black-rendered portions correspond to highly illuminated portions of the patterns while the non-rendered (ie. white) portions correspond to low (or essentially non) illuminated portions of the patterns.

Figure 20B:
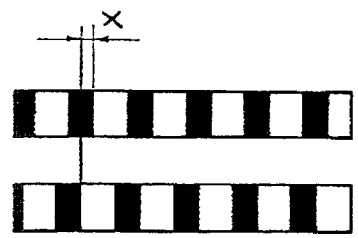
FIG. 20b shows typical patterns produced on the first and second arrays according the first embodiment of the present invention, where these arrays are one dimensional arrays.
Figure 20A:
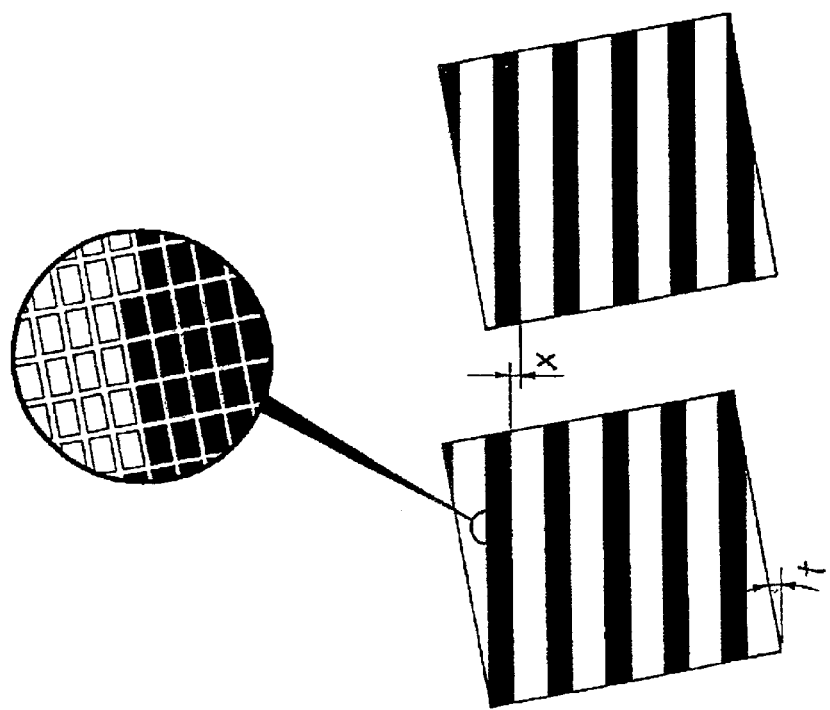
FIG. 20a shows typical patterns produced on the first and second arrays according the first embodiment of the present invention, where these arrays are two dimensional arrays.

FIGS. 20a and 20b show typical patterns produced by incident EMR on first and second arrays according to the first embodiment of the present invention. In FIG. 20a the arrays are two dimensional arrays, and for example each incorporate a Texas Instruments TC277 Black & White CCD Image Sensor with 699×288 pixels and an active window size of approximately 8 mm×6 mm. The methods by which the patterns are processed are generally well known in the art of image analysis, and some of these methods used are described in "Vision Chips: Implementing Vision Algorithms with Analog VLSI Circuits", by Christof Koch and Hua Li, IEEE Computer Society Press, ISBN 0-8186-6492-4. In order to improve edge delineation, it is seen in FIG. 20a that the arrays are mounted at a small angle 't' (typically less than 15 deg.) with respect to the respective patterns. This misalignment produces more information relating to the edge position since the pattern no longer "beats" with the pixel alignment of the array and regression techniques are therefore more accurate due to an increased amount of data. Dimension 'x', being the average relative displacement between the patterns on the two arrays, relates directly to the relative angular displacement of the two grating elements and hence to shaft torque. In FIG. 20b the arrays are one dimensional arrays, and for example each incorporate a Texas Instruments TSL1410 Black & White Linear Array chip with 128 pixels and an active window length of approximately 8 mm. Dimension 'x' is measured similarly however, without the benefits of improved edge delineation provided by the above mentioned two dimensional arrays. In the case of all embodiments of the arrays described in this specification, a lens (for example spherical, aspherical, or Fresnel) or a fibre optic array light guide is incorporated in front of the EMR sensitive detectors in order that the incident EMR is focussed as a sharp pattern and any spurious cross-reflection is minimised.

FIGS. 21a and 21b show typical patterns produced by incident EMR on a single array according to the second embodiment of the present invention. In FIG. 21a the array is a two dimensional array as described above. Dimension '(x−y)/2', being the average relative displacement between the interdigitally disposed wide and narrow subpatterns 50 and 51 respectively, relates directly to the relative angular displacement of the two grating elements and hence to shaft torque. FIG. 21b shows the pattern in the case of a one dimensional array as described above. Dimension '(x−y)/2' can be measured similarly and the appropriate recognition and processing aspects are well described in International Patent Application PCT/GB95/02017.

FIG. 22 shows a typical pattern produced by incident EMR on a single two dimensional array according to the third embodiment of the present invention. Again dimension '(x−y)/2', being the average relative displacement between the two laterally separated subpatterns 52 and 53, relates directly to the relative angular displacement of the two grating elements and hence to shaft torque.

Figure 23A:
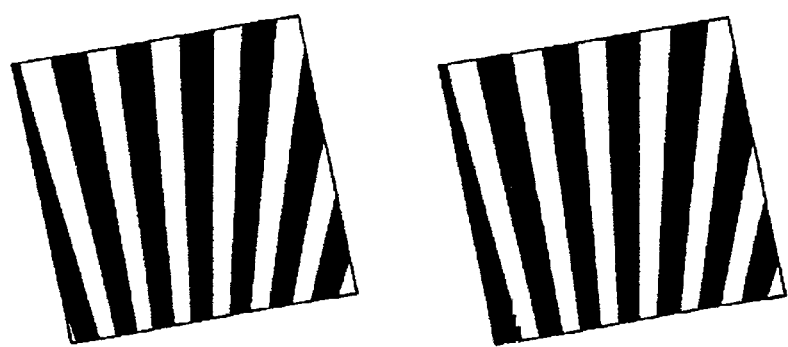
FIG. 23a shows typical patterns produced on the first and second arrays according to the fourth embodiment of the present invention, where these arrays are two dimensional arrays.
Figure 23B:
FIG. 23b shows typical patterns produced on the first and second arrays according to the fourth embodiment of the present invention, where these arrays are one dimensional arrays.

FIGS. 23a and 23b show typical patterns produced by incident EMR on first and second arrays according to the fourth embodiment of the present invention. Of course the patterns in this case are substantially radially disposed rather than parallel as in the case of the first embodiment shown in FIGS. 20a and 20b, still the basic methodology for determination of dimension 'x', and hence shaft torque, is similar for both cases of the arrays being two dimensional or one dimensional.

Figure 24A:
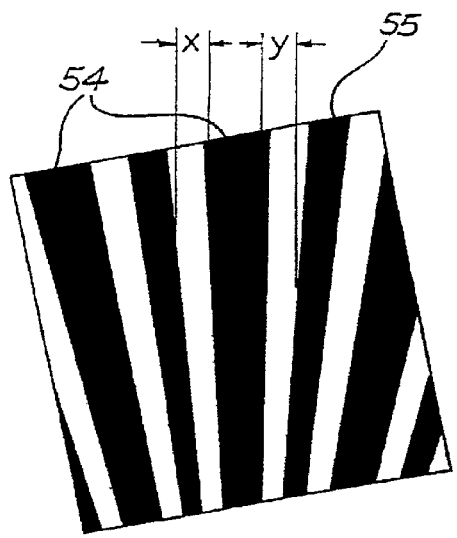
FIG. 24a shows a typical pattern produced on the single array according to the fifth embodiment of the present invention, where this array is a two dimensional array.
Figure 24B:
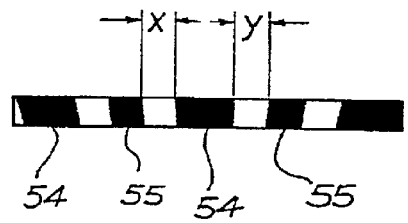
FIG. 24b shows a typical pattern produced on the single array according to the fifth embodiment of the present invention, where this array is a one dimensional array.

FIGS. 24a and 24b show typical patterns produced by incident EMR on a single array according to the fifth embodiment of the present invention. Apart from the wide and narrow interdigitally disposed subpatterns 54 and 55 being substantially radially disposed, rather than parallel as in the case of the second embodiment shown in FIGS. 21a and 21b, the basic methodology for determination of dimension '(x−y)/2', and hence shaft torque, is similar for both cases of two dimensional and one dimensional arrays.

Figure 25:
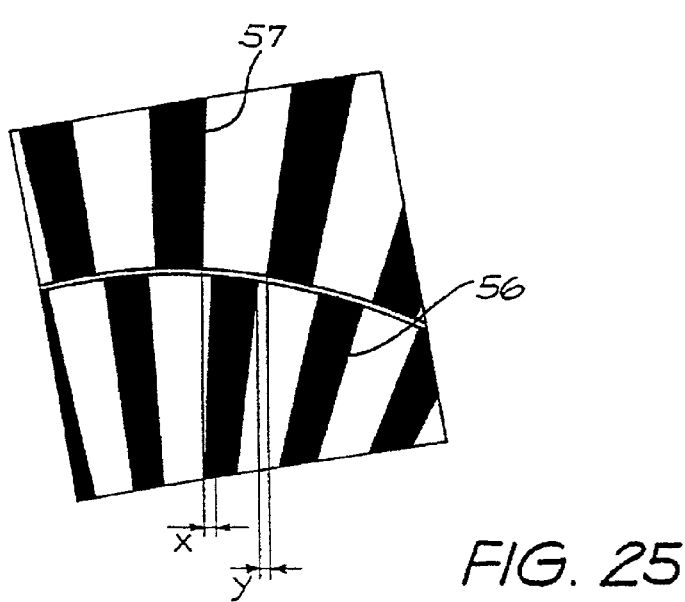
FIG. 25 shows a typical pattern produced on the single two dimensional array according to the sixth embodiment of the present invention.

FIG. 25 shows a typical pattern produced by incident EMR on a single two dimensional array according to the sixth embodiment of the present invention. Dimension '(x−y)/2', being the average relative displacement between the two radially separated subpatterns 56 and 57, relates directly to the relative angular displacement of the two grating elements and hence to shaft torque.

For all six embodiments described above the pattern migrates across the limited width one dimensional or two dimensional array(s) as the shaft rotates, quite independent of shaft torque. Again, using techniques well known in the discipline of pattern recognition, the rate of pattern migration and the total displacement of the pattern can be calculated providing a measure of the angular velocity and relative angular position of the torque input members. A "home mark" on the surface of one of the grating elements, as described in reference to FIG. 19, can be used as an absolute angular position reference. The intervening marks can be counted from this home mark position by the processor to provide a measurement of absolute angular position of the torque input member to which the relevant grating element is attached to or integral with.

FIGS. 26a–e show details of the regions of high and low reflectivity on the cylindrical surfaces of grating elements 58 and 59, according to another alternative version of the third embodiment of the present invention (refer back to FIGS. 8 and 9). These regions are arranged in the form of a succession of 120 individual non-overlapping binary bar codes 60a–g . . . and 61a–g . . . on the periphery of each of the grating elements 58 and 59 respectively. These 120 bar codes are disposed at a uniform 3 degree angular spacing on the periphery of each grating element.

Figure 27:
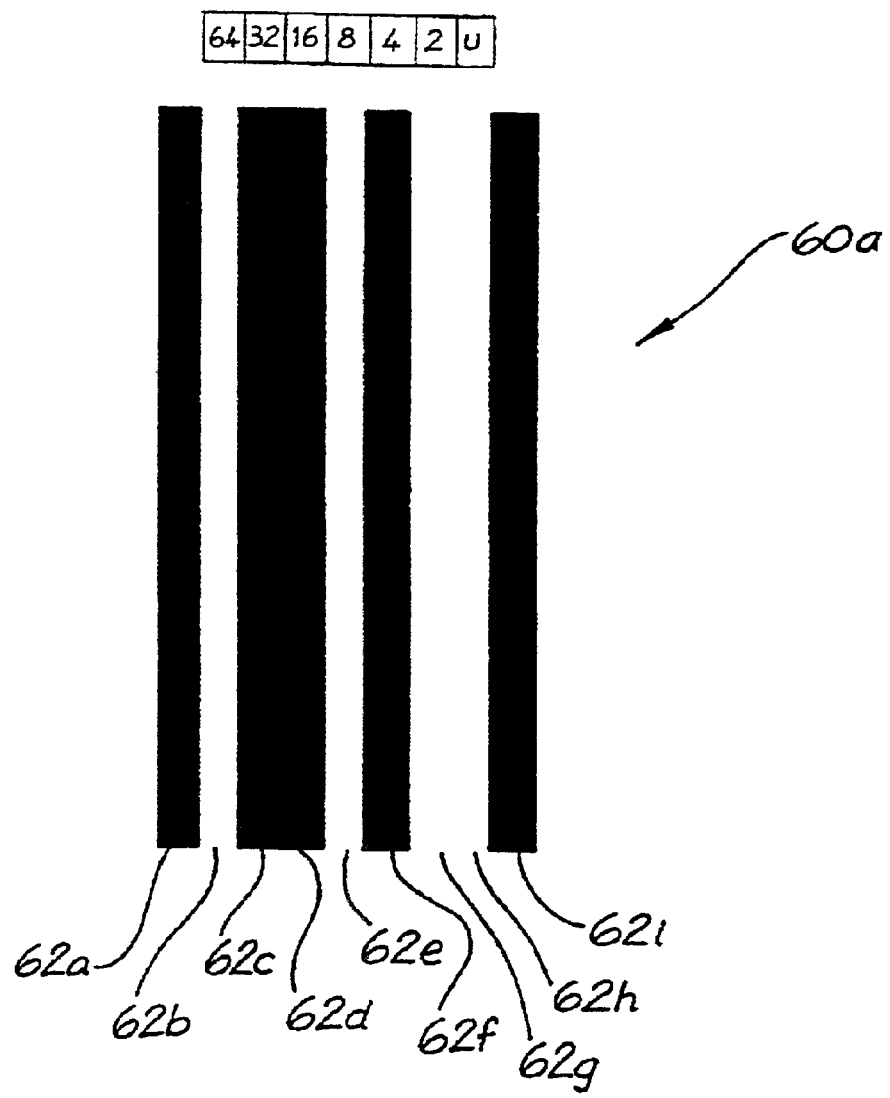
FIG. 27 shows details of the regions of high and low reflectivity on one of the binary bar codes shown in FIGS. 26a–e, FIGS. 28a and 28b show successive relative positions of the grating elements for yet another alternative version of the third embodiment of the present invention allowing also the measurement of absolute angular position of the torque input members.

FIG. 27 shows details of bar code 60a on grating element 58, in order to better describe the bar code format. Each bar code comprises 9 bars in total: one "start" bar 62a, seven "angle position" bars 62b–h, and one "stop" bar 62i. In this embodiment start bar 62a and stop bar 62i are always regions of high reflectivity whereas interposed angle position bars are either regions of high or low reflectivity depending on the binary value of the angle position value to be encrypted. For example bar code 60a comprises regions of high reflectivity in the form of bars 62c, 62d, and 62f and regions of low reflectivity in the form of bars 62b, 62e, 62g and 62h. Bar code 60a therefore has a binary value of 0110100 or an angle position value of 52 (base 10). The use of seven angle position bars enables theoretically the encryption of up to 128 discrete angle position values which is necessary to encompass and individually identify each of the 120 bar codes on each grating element.

Figure 26A:
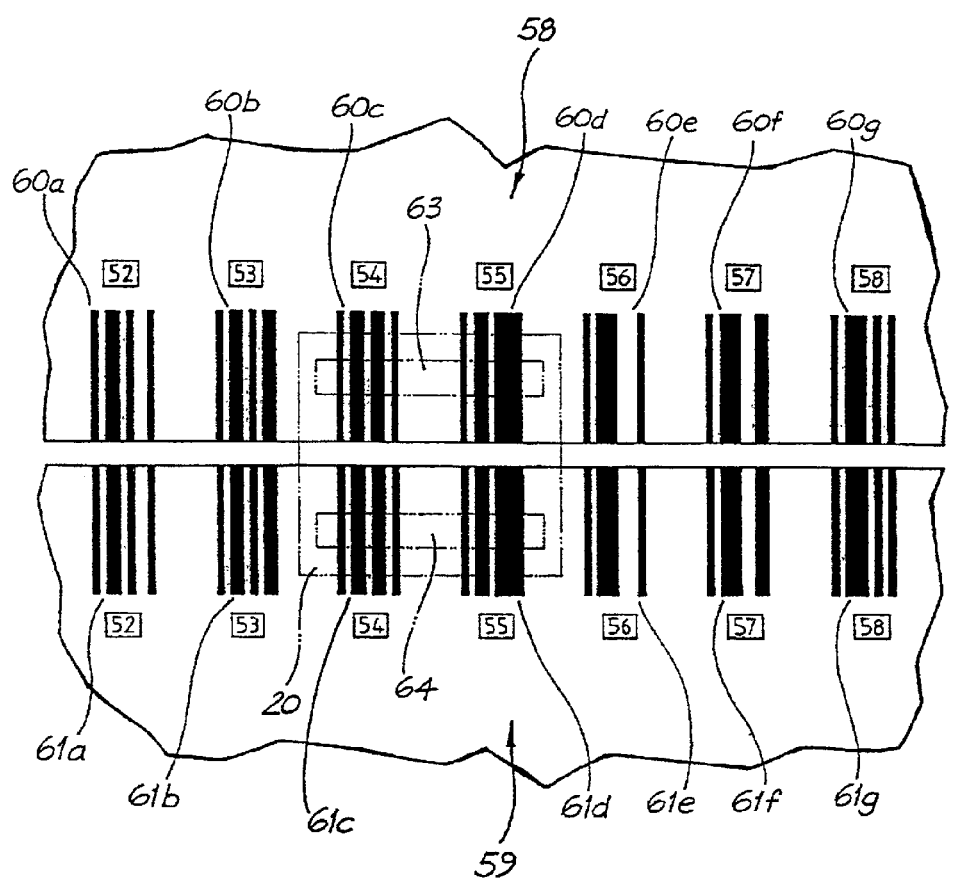
FIGS. 26a–e show successive relative positions of the grating elements for another alternative version of the third embodiment of the present invention allowing also the measurement of absolute angular position of the torque input members.
Figure 26B:
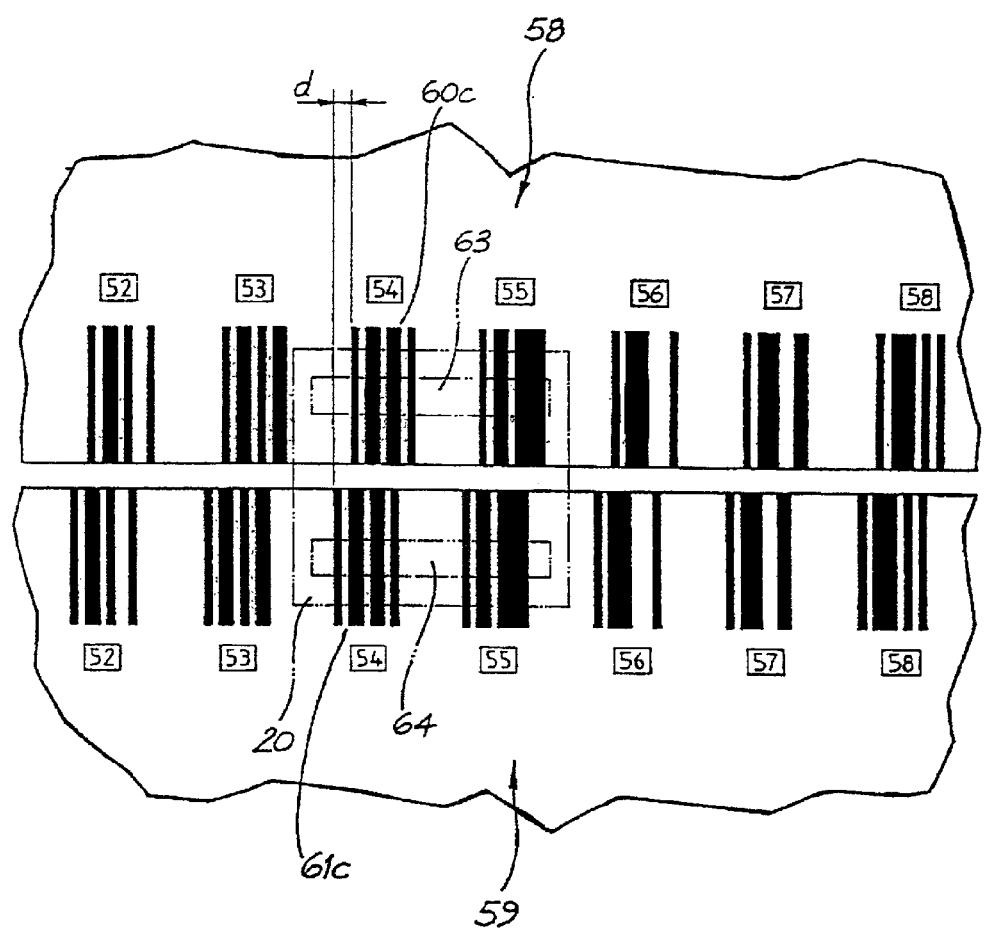
Figure 26C:
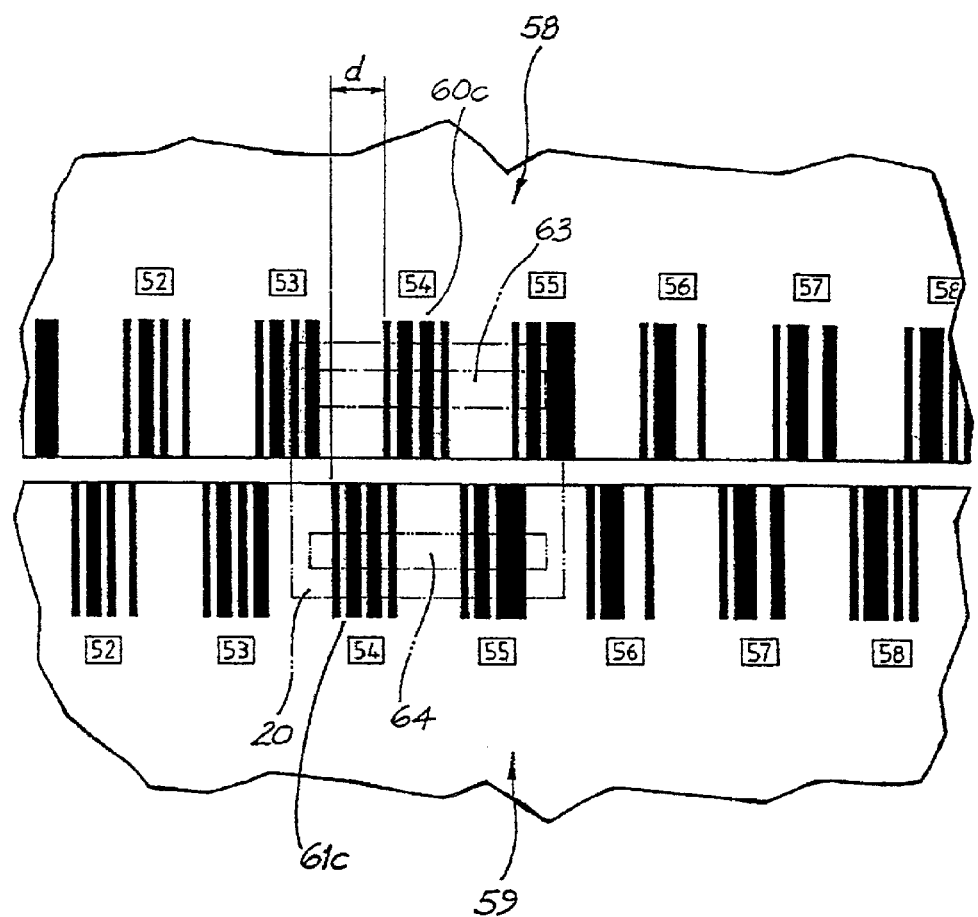
Figure 26D:
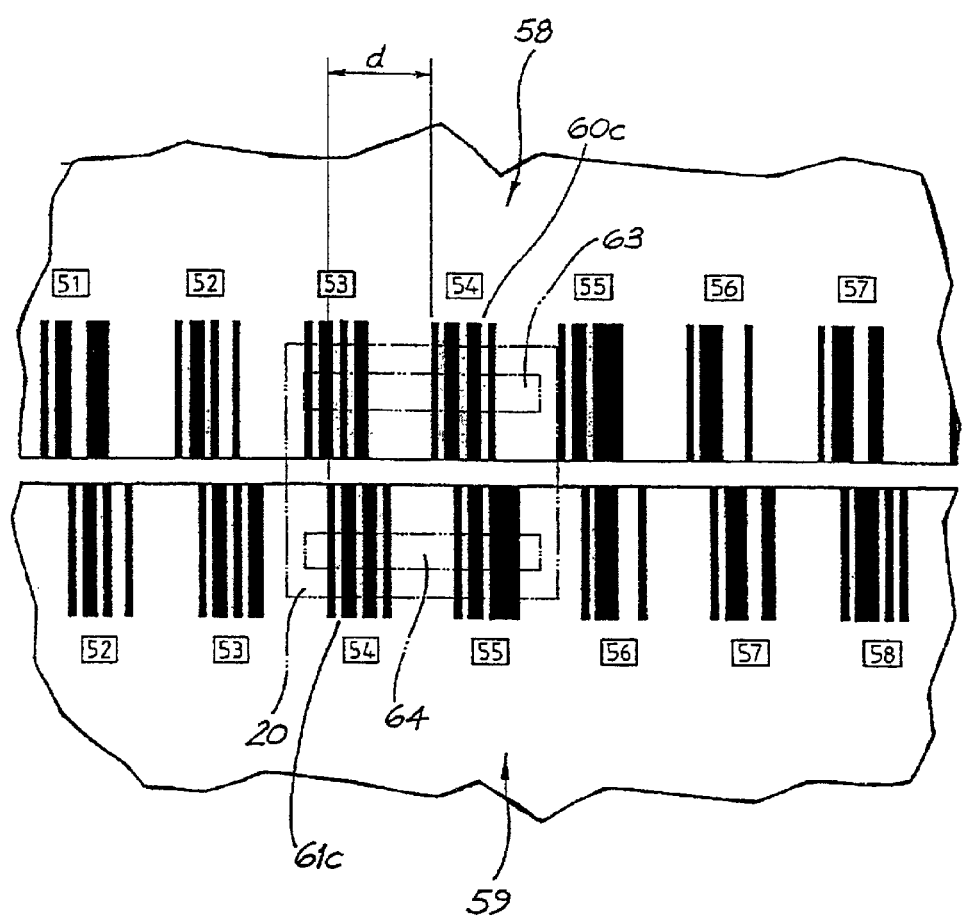

FIG. 26a shows the position of grating elements 58 and 59 when zero torque is applied to torque input members 1a and 1b (refer back to FIG. 8). It is seen that bar codes 60a and 61a, both corresponding to angle position value of 52 on grating elements 58 and 59 respectively, are mutually aligned for this zero torque condition. The same is true for all other 119 bar code pairs 60b and 61b, 60c and 61c, etc. The method of manufacturing of such successions of bar codes on grating elements, and accurately mutually aligning them at the zero torque condition, is described in a co-pending Australian Provisional Patent Application entitled "Method For Manufacture of Optical Torque Transducers".

FIGS. 26b–e show successive relative angular displacements of grating elements 58 and 59 as an increasing anticlockwise torque is applied to torque input member 1b with respect to torque input member 1a. The viewing window of two-dimensional array 20 is also shown superimposed as dotted lines in these diagrams. Note that this viewing window is chosen to be sufficiently large to always capture at least one complete bar code from each of the two grating elements, irrespective of the relative angular displacement of the two grating elements (as a function of input torque) and the absolute rotation angle of the grating elements over their 360 degree possible range (as a function of steering angle). In order to reduce total silicon usage (and hence cost), two separate one-dimensional (ie. linear) arrays or smaller elongated two-dimensional arrays 63 and 64 could be used instead of the larger two dimensional array 20. In certain VLSI vision chip configurations, array 20 or arrays 63 and 64 may be embedded in, attached to, or integrated as part of, the microprocessor chip used to carry out the necessary processing, that is processor 9.

Array 20 (or arrays 63 and 64) receive incident EMR reflected from the regions of high reflectivity on the surfaces of grating elements 58 and 59 which are instantaneously in the array's (or arrays') viewing window. In the example shown in FIGS. 26b–d, array 20 (or arrays 63 and 64) receive incident EMR from bar codes 60c and 61c and processor 9 is therefore able to derive relative displacement distance 'd' of the peripheries of respective grating elements 58 and 59 and hence a measure of input torque.

Figure 28A:
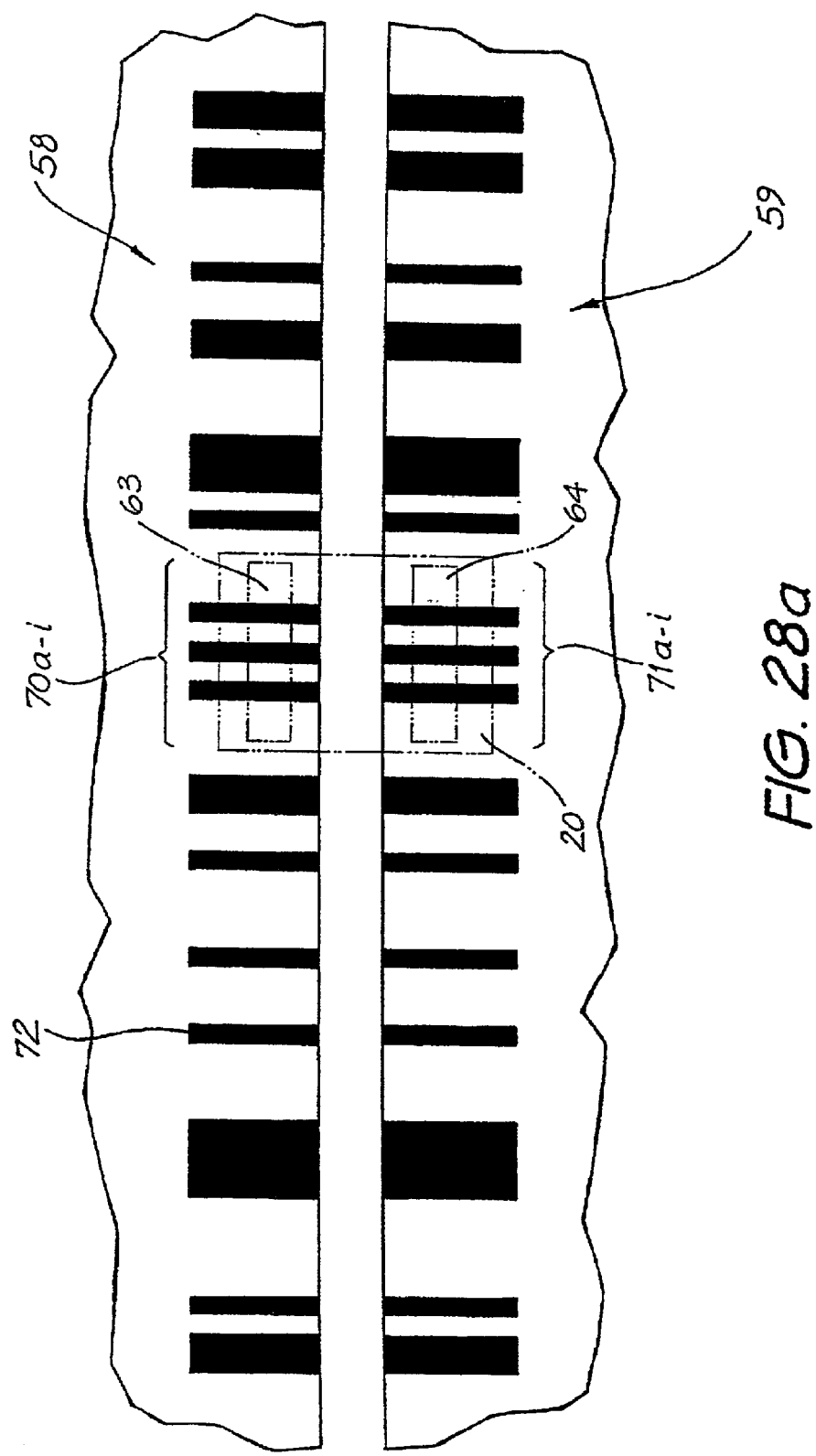
Figure 28B:
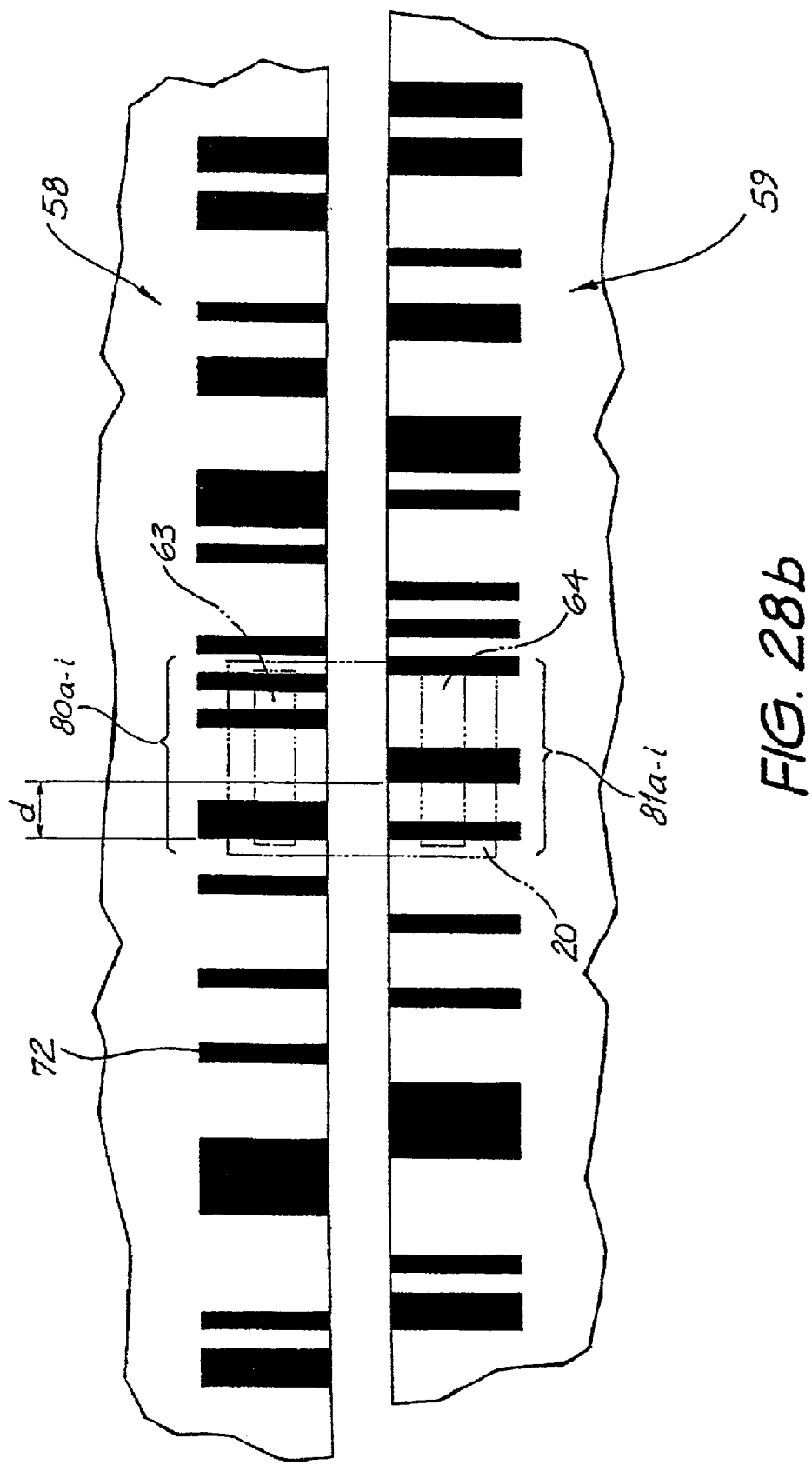

FIGS. 28a and 28b show the position of grating elements 58 and 59 for two successive relative positions, according to another alternative version of the third embodiment of the present invention (refer back to FIGS. 8 and 9). Zero torque is applied to torque input members 1a and 1b (refer back to FIG. 8) in the case of FIG. 28a. FIG. 28b shows the situation of a torque applied to torque input members 1a and 1b producing a relative displacement 'd' of the peripheries of respective grating elements 58 and 59. These regions are arranged in the form of a succession of 512 individual 9 bit binary bar codes 70a–i . . . and 71a–i . . . on the periphery of each of the grating elements 58 and 59 respectively. An example of one combination of such bar codes is described as an Ouroborean ring in "Game, Set and Math" by Ian Stewart, Penguin Books, 1989. These 512 bar codes overlap and are disposed at a circumferential spacing equal to an integer multiple of the width of one of the bars 72 on the periphery of each grating element. In the embodiment shown, this multiple is unity, and the spacing is equal to the width of one of the bars. The viewing window of two-dimensional array 20 is also shown superimposed as dotted lines in these diagrams. In order to reduce total silicon usage (and hence cost), two separate one-dimensional (ie. linear) arrays or smaller elongated two-dimensional arrays 63 and 64 could be used instead of the larger two dimensional array 20. In certain VLSI vision chip configurations, array 20 or arrays 63 and 64 may be embedded in, attached to, or integrated as part of, the microprocessor chip used to carry out the necessary processing, that is processor 9. Array 20 (or arrays 63 and 64) receive incident EMR reflected from the regions of high reflectivity on the surfaces of grating elements 58 and 59 which are instantaneously in the array's (or arrays') viewing window. As shown in FIG. 28b, array 20 (or arrays 63 and 64) receive incident EMR from bar codes 80a–i and 81a–i and processor 9 is therefore able to derive relative displacement distance 'd' of the peripheries of respective grating elements 58 and 59 and hence a measure of input torque. In the situation shown in FIG. 28b, the grating elements 58 and 59 have also net-rotated from the position shown in FIG. 28a, causing the array 20 (or arrays 63 and 64) to receive incident EMR from bar codes 80a–i and 81a–i, which are displaced from (but still overlap) bar codes 70a–i and 71a–i. Note that the viewing window is chosen to be sufficiently large to always capture at least one complete bar code from each of the two grating elements, irrespective of the relative angular displacement of the two grating elements (as a function of input torque) and the absolute rotation angle of the grating elements over their 360 degree possible range (as a function of steering angle).

Figure 29:
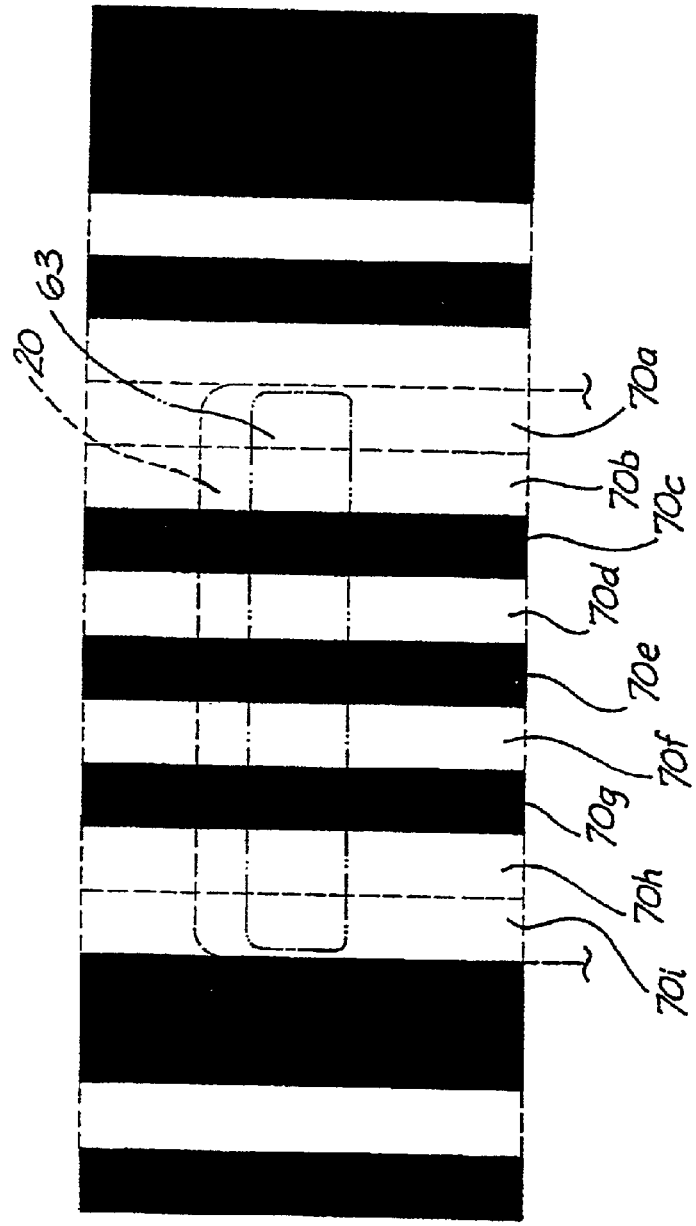
FIG. 29 shows details of the regions of high and low reflectivity on one of the binary bar codes shown in FIGS. 28a and 28b.

FIG. 29 shows details of bar code 70a–i on grating element 58, in order to better describe the bar code format. Each bar code comprises 9 bars in total. In this embodiment the bars are either regions of high or low reflectivity depending on the binary value of the angle position value to be encrypted. For the example shown, bar code 70a–i comprises regions of high reflectivity in the form of bars 70c, 70e and 70g and regions of low reflectivity in the form of bars 70a, 70b, 70d, 70f, 70h and 70i. Bar code 70a–i therefore has a binary value of 001010100 or an angle position value of 84 (base 10). The use of nine angle position bars enables theoretically the encryption of up to 512 discrete angle position values which is necessary to encompass and individually identify each of the 512 bar codes on each grating element.

Most importantly however, in both of the bar code embodiments described in FIGS. 26–29, processor 9 is now also programmed to decode the angle position values of all complete binary bar codes which are in the viewing window at any one time. For example in the case of the bar code embodiment shown in FIGS. 26 and 27, bar codes 60c and 61c both correspond to angle position value 54. The use of bar codes in general has two significant advantages in the case of the present invention.

Figure 26E:
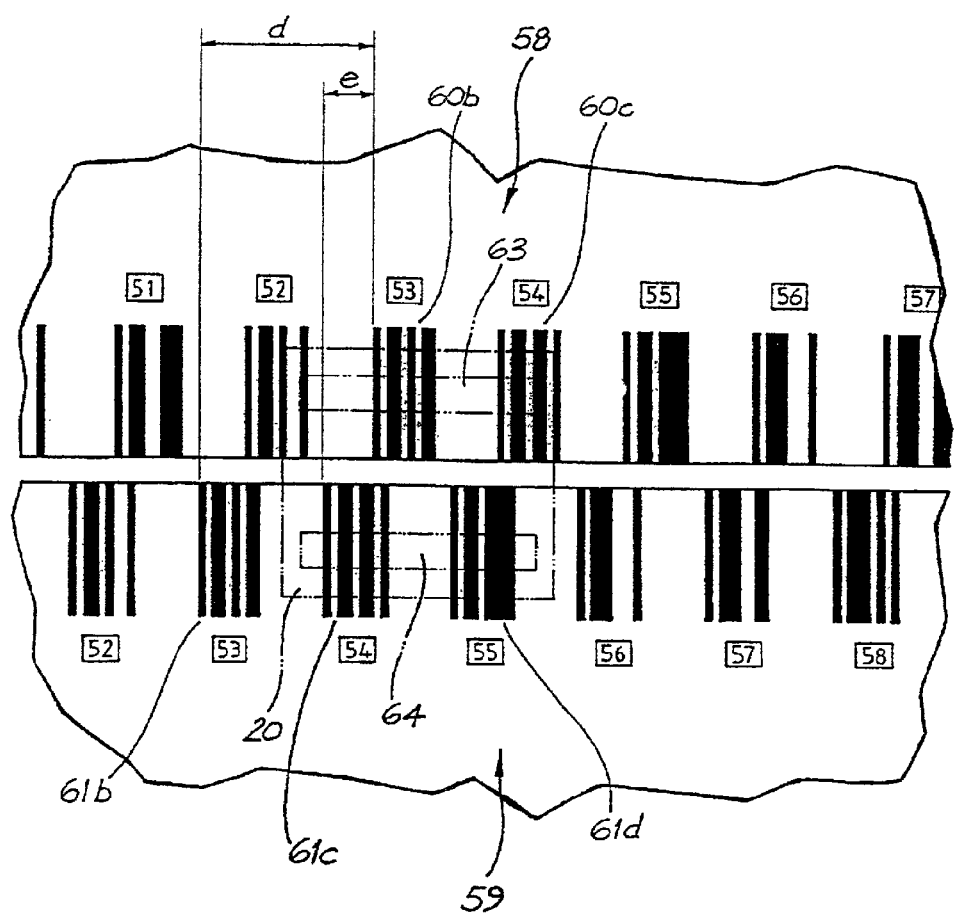

Firstly, for still larger relative displacements of grating element 58 with respect to grating element 59, the problem of aliasing is avoided. This is readily demonstrated in the case of the bar code embodiment shown in FIGS. 26 and 27. In FIG. 26e bar code 60b (angle position value 53) on grating element 58 has displaced a sufficient distance to the right that it now actually lies between bar codes 61c and 61d (angle position values 54 and 55 respectively) on grating element 59. However by recognising that the angle position value of bar code 60b is 53, and that therefore its relative position at the zero torque condition is adjacent to bar code 61b on grating element 59, the correct relative displacement of the grating elements can be calculated as:

$$d = e + (54-53) \cdot 3 \cdot r \cdot pi/180 = e + 3 \cdot r \cdot pi/180 \text{ (deg)}$$

where r is the radius of the grating element.

Without the use of bar codes, aliasing would have occurred for a much smaller relative displacement of the two grating elements, namely when bar code 60b became adjacent to bar code 61c. By arranging the regions of high and low reflectivity in the form of successive binary bar codes, relative angular displacements of grating elements 58 and 59 can be correctly measured for substantial deviations from the zero torque condition, and independent of the actual spacing of the regions of high and low reflectivity.

Secondly, use of bar codes enables measurement of the absolute angular position of either of the two torque input members 1a and 1b through a range of 360 deg, that is +/−180 deg from some known absolute position. This is achieved without the need for any counting process to be carried out in processor 9 (as in the case of the previous alternative version of the third embodiment of the present invention shown in FIG. 19).

If the maximum relative angular displacement of the grating elements is externally limited in some manner, for example via the use of a failsafe mechanism as earlier described, aliasing may not be a problem and in this case successive bar codes may be employed on only one of the two grating elements. This will still provide sufficient information to provide a measure of absolute angular position over the above mentioned +/−180 deg range.

It should be noted that the use of bar codes can be similarly applied to other cylindrical reflective grating element configurations, for example that described in reference to the first embodiment of the present invention (refer to FIGS. 1 and 2). Also bar codes can be applied to radially disposed reflective grating element configurations, for example those described in reference to the fourth (FIGS. 10 and 11) and sixth (FIGS. 15 and 16) embodiments of the present invention.

Also, it should be noted that bar codes can take many forms apart form the non-overlapping (discrete) barcode arrangement shown in FIGS. 26a–e and FIG. 27, and the overlapping (Ouroborean) barcode arrangement shown in FIGS. 28a–b and FIG. 29. For example a classic Manchester barcode arrangement (as used on computer hard disk drives) or a constantly pitched "thick-thin line" barcode arrangement (as used on many household consumer products) would also be suitable for application to cylindrically and radially disposed grating elements.

It should also be noted that the succession of bar codes could have reverse reflectivity compared to the embodiment described, that is low reflectivity regions imposed over a high reflectivity background, rather than the other way around as described. Also in the present specification "high reflectivity" and "low reflectivity" is broadly defined in reference to the particular EMR source selected. For example, if a red light EMR source was used, the regions of high and low reflectivity of the surfaces of the reflective gratings may consist of regions which are painted (or otherwise coloured by some means) with a red and blue surface coating respectively.

Lastly it should be noted that the surfaces of the reflective grating elements may have forms other than the cylindrical or disc-like forms described by way of the above mentioned embodiments. Specifically the surfaces of the grating elements can have other three-dimensional axi-symmetric forms about the axis of the shaft, for example conical, elliptoidal, or paraboloidal forms. Any arbitrary axisymmetric form of surface can potentially be used providing that the deviation of the distance between the surface and the respective array (receiving incident EMR from this surface) is sufficiently small in magnitude, that the afore mentioned lens or fibre optic light guide system can maintain a satisfactory level of focus of the patterns (or subpatterns on the array).

Figure 30A:
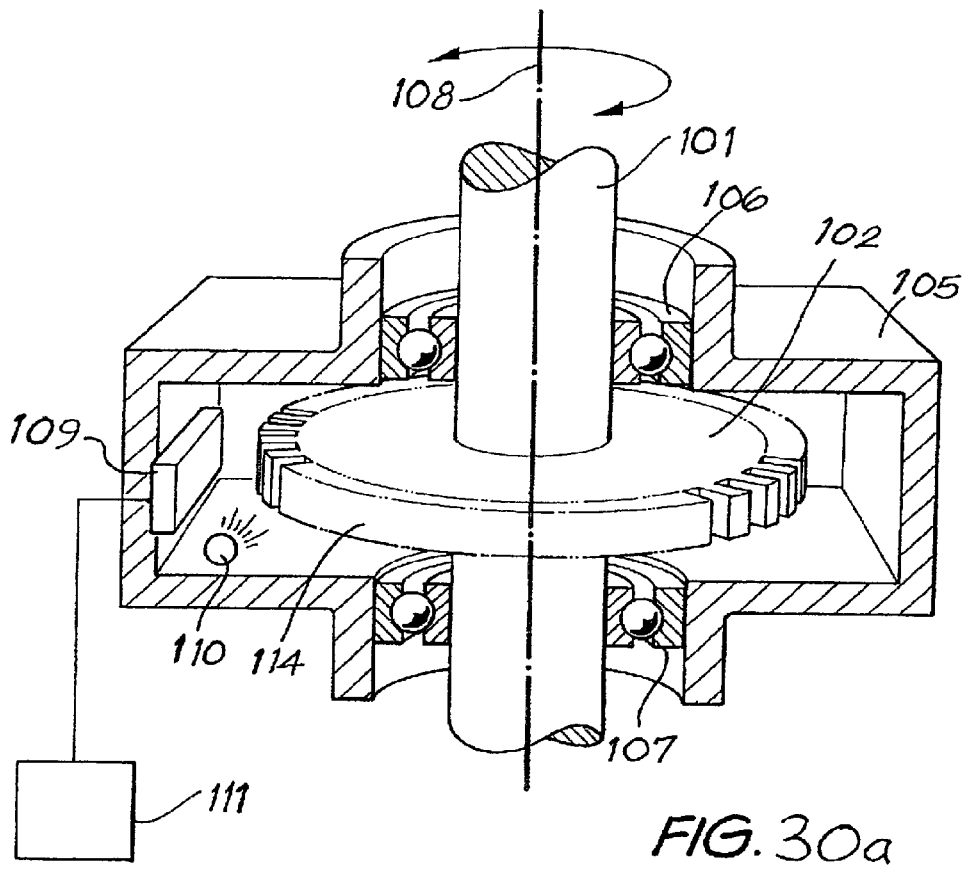
FIG. 30a is a diagrammatic sectional view of an angular position sensor according to a first embodiment of the present invention showing the rotatable body consisting of regions of high and low reflectivity provided by radially protruding castellations, and a radially disposed photodetector array.
Figure 30B:
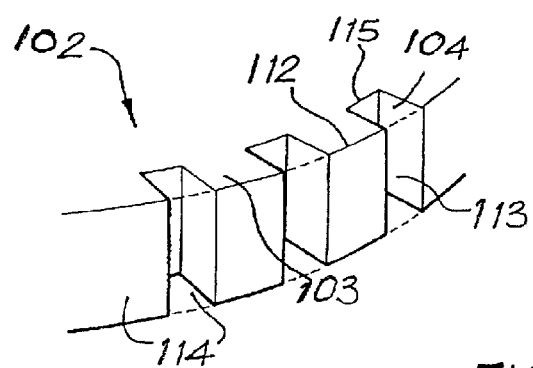
FIG. 30b is a larger scale view of a portion of the grating element shown in FIG. 30a, FIG. 31a is a diagrammatic sectional view of an angular position sensor similar to that shown in FIG. 30a employing axially protruding castellations and an axially disposed photodetector array.

FIGS. 30a & 30b show an angular position sensor according to a first embodiment of the present invention. Rotatable body 101 comprises grating element 102 with a discontinuous outer cylindrical surface 114 composed of alternating regions of high and low EMR reflectivity, arranged in the form of a succession of individual binary bar codes. Grating element 102 comprises radially protruding castellations 103 interposed between radially extending cavities 104. The regions of high reflectivity on cylindrical surface 114 correspond to areas of maximum radius 112 of castellations 103 with respect to axis of rotation 108 of rotatable body 101, and may be smoothly machined, moulded or sintered, or surface treated with paint or material deposition to impart the required high reflectivity. The regions of low reflectivity on cylindrical surface 114 correspond to discontinuous gap areas 113, and are substantially non-reflective due to the presence of cavities 104, comprising areas of minimum radius 115 which are disposed at lesser radius than aforementioned areas 112, and are ideally machined, moulded or sintered, or surface treated with paint or material deposition to impart low reflectivity. Rotatable body 101 is enclosed in housing 105 and supported in bearings 106 and 107, and is able to rotate about axis of rotation 108. EMR source 110 and EMR sensitive photodetector array 109 are fixed in housing 105 and arranged such that EMR source 110 illuminates discontinuous surface 114, which reflects EMR to the substantially radially disposed array 109. Thus a pattern is produced on array 109, which is processed by processor 111 to provide a measure of the absolute angular position of rotatable body 101 with respect to housing 105. It should be noted that the words "reflection", "reflected" and "reflectivity" in this specification are relate to specular and/or diffused reflection.

Figure 31A:
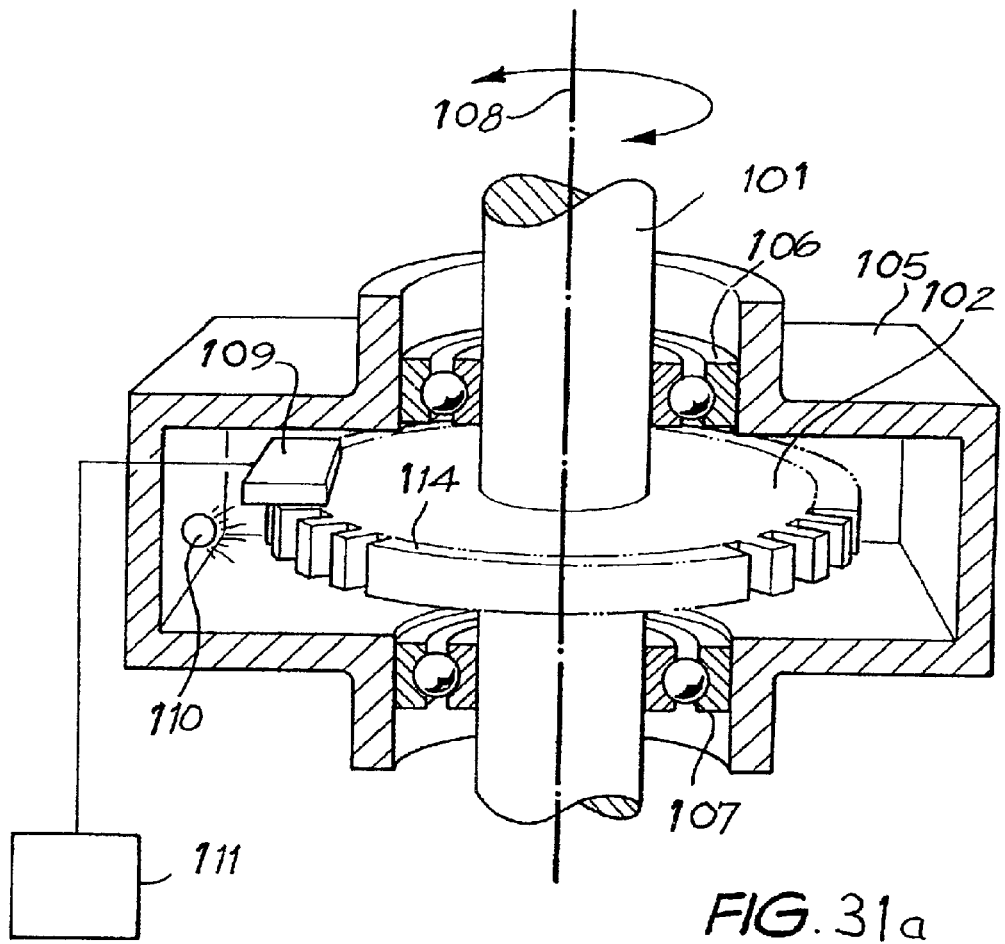
FIG. 31b is a larger scale view of a portion of the grating element shown in FIG. 31a, FIG. 32a is a diagrammatic sectional view of an angular position sensor according to a second embodiment of the present invention showing a rotatable body consisting of a cylindrical scale surface with regions of high and low reflectivity and a radially disposed photodetector array.
Figure 31B:
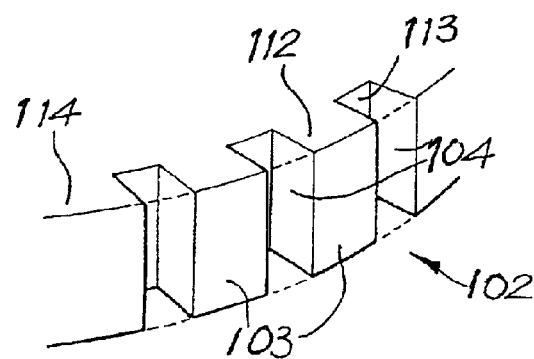

FIGS. 31a & 31b show an alternative angular position sensor according to the first embodiment of the present invention. Rotatable body 101 comprises grating element 102 with a discontinuous radially oriented flat disc surface 114 composed of alternating regions of high and low EMR reflection, arranged in the form of a succession of individual binary bar codes. Grating element 102 comprises axially protruding castellations 103 interposed between axially extending cavities 104. The regions of high reflectivity correspond to areas of maximum axial protrusion 112 of castellations 103 with respect to axis of rotation 108 of rotatable body 101, and may be smoothly machined, moulded or sintered, or surface treated with paint or material deposition to impart the required high reflectivity. The regions of low reflectivity correspond to discontinuous gap areas 113, and are substantially non-reflective due to the presence of cavities 104. Rotatable body 101 is enclosed in housing 105 and supported in bearings 106 and 107, and is able to rotate about axis of rotation 108. EMR source 110 and EMR sensitive photodetector array 109 are fixed in housing 105 and arranged such that EMR source 110 illuminates discontinuous surface 114, which re-radiates EMR to the substantially axially disposed array 109. Thus a pattern is produced on array 109, which is processed by processor 111 to provide a measure of the absolute angular position of rotatable body 101 with respect to housing 105.

Figure 32A:
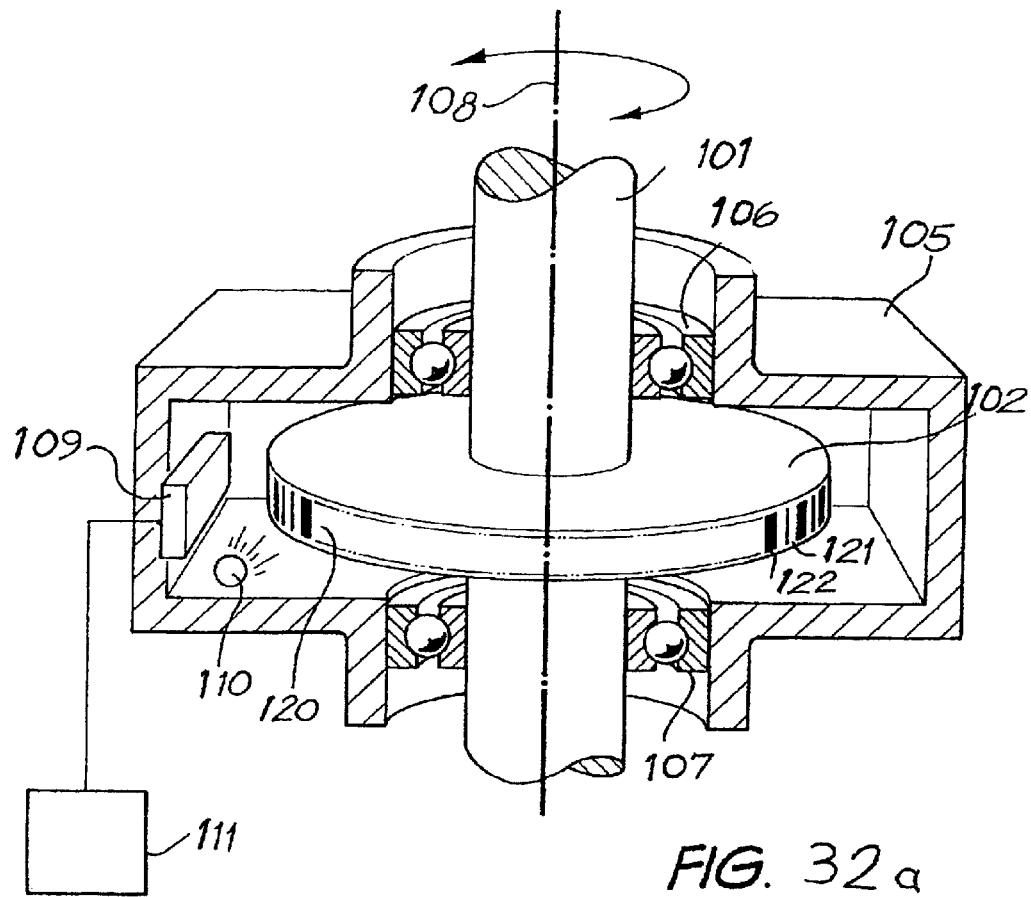
FIG. 32b is a larger scale view of a portion of the grating element shown in FIG. 32a, FIG. 33a is a diagrammatic sectional view of an angular position sensor similar to that shown in FIG. 32a employing a disc shaped scale surface with an axially disposed photodetector array.
Figure 32B:
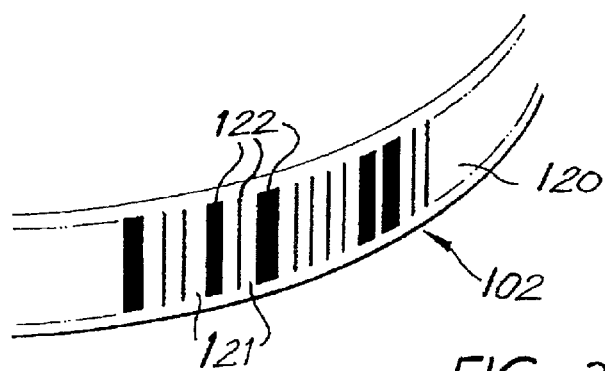

FIGS. 32a & 32b show an angular position sensor according to a second embodiment of the present invention. Grating element 102 of rotatable body 101 comprises a continuous cylindrical surface in the form of graduated scale 120 composed of alternating regions of high and low EMR reflectivity, arranged in the form of a succession of individual binary bar codes. A metallised coating, or other shiny or light coloured material or surface treatment, provides substantially axially aligned regions of high reflectivity 121. A substantially transparent, roughened or dark coloured material or surface treatment provides the interspaced regions of low reflectivity 122. Rotatable body 101 is enclosed in housing 105 and supported in bearings 106 and 107, and is able to rotate about axis of rotation 108. EMR source 110 and EMR sensitive photodetector array 109 are fixed in housing 105 and arranged such that EMR source 110 illuminates the regions of high and low reflectivity 121 and 122 which re-radiates EMR to the substantially radially disposed array 109. Thus a pattern is produced on array 109, which is processed by processor 111 to provide a measure of the absolute angular position of rotatable body 101 with respect to housing 105.

Figure 33A:
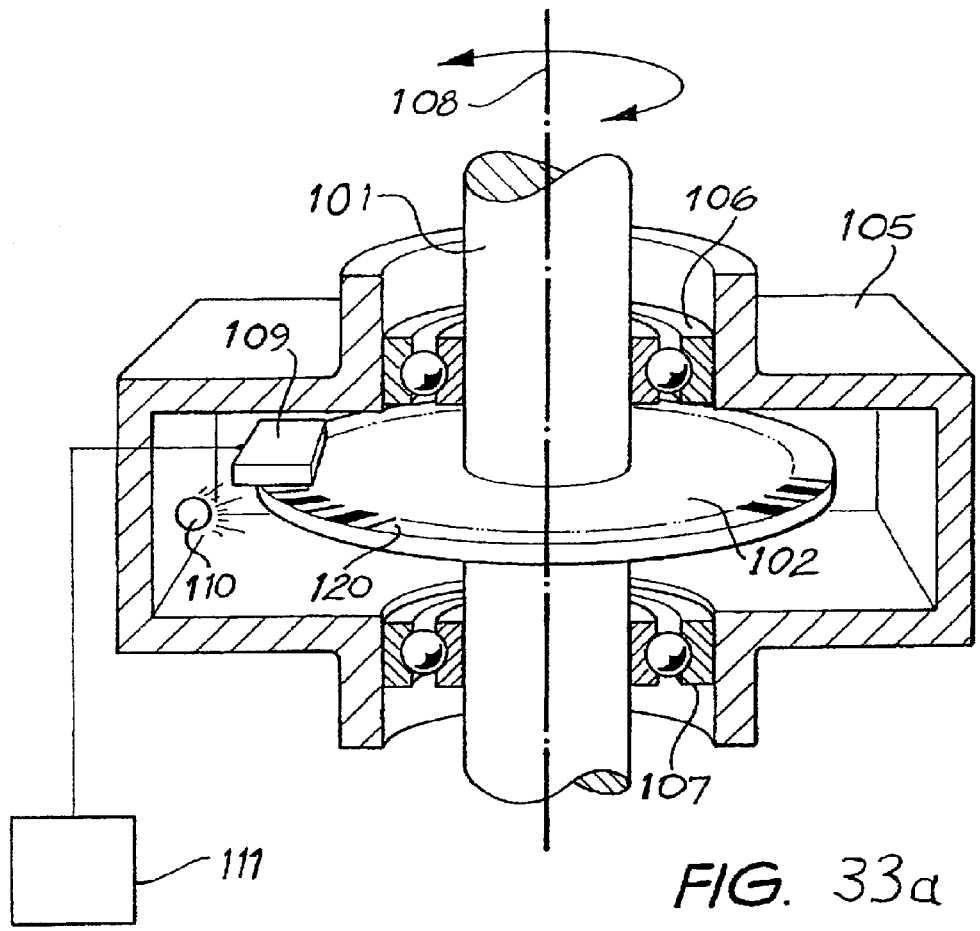
FIG. 33b is a larger scale view of a portion of the grating element shown in FIG. 33a, FIG. 34 is a diagram illustrating the pattern incident on the photodetector array and a technique employed providing both coarse resolution absolute angle measurement and fine resolution interpolated incremental measurement.
Figure 33B:
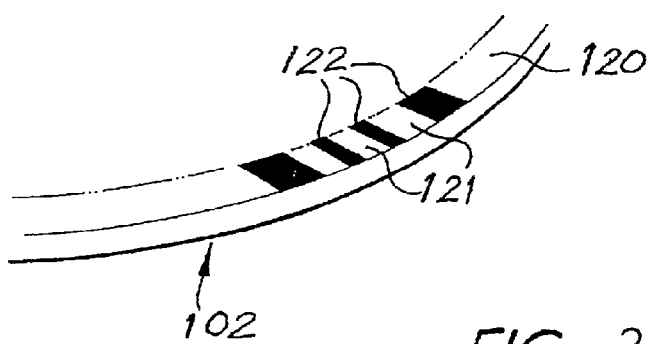

FIGS. 33a & 33b show an alternative angular position sensor according to a second embodiment of the present invention. Grating element 102 of rotatable body 101 comprises a continuous radially oriented flat disc surface in the form of graduated scale 120 composed of alternating regions of high and low EMR reflectivity, arranged in the form of a succession of individual binary bar codes. A metallised coating, or other shiny or light coloured material or surface treatment, provides substantially radially aligned regions of high reflectivity 121. A substantially transparent, roughened or dark coloured material or surface treatment provides the interspaced regions of low reflectivity 122. Rotatable body 101 is enclosed in housing 105 and supported in bearings 106 and 107, and is able to rotate about axis of rotation 108. EMR source 110 and EMR sensitive photodetector array 109 are fixed in housing 105 and arranged such that EMR source 110 illuminates the regions of high and low reflectivity 121 and 122 which re-radiates EMR to the substantially axially disposed array 109. Thus a pattern is produced on array 109, which is processed by processor 111 to provide a measure of the absolute angular position of rotatable body 101 with respect to housing 105.

In the case of both first or second embodiments, it will be appreciated that processor 111 can readily be programmed or hardwired to calculate the rate of change of absolute angular position of rotatable body 101 as a function of time, and therefore also provide a measure of absolute angular velocity of rotatable body 101 with respect to housing 105.

Figure 34:
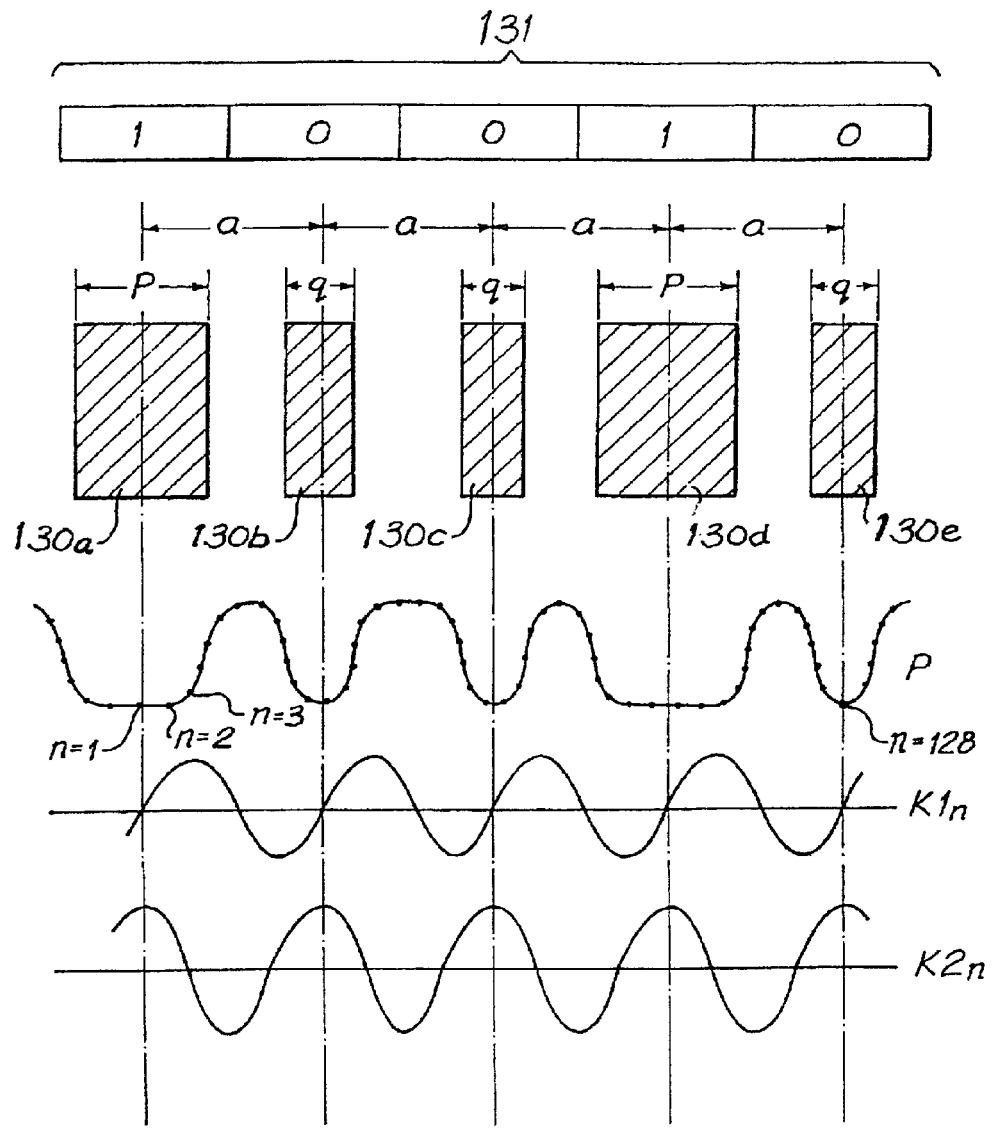

FIG. 34 shows an example of a pattern produced by incident EMR on array 109 according to the first or second embodiment of the present invention (also according to a third embodiment described below). The individual bits 130a–e represent dark areas of the pattern on array 109 caused by reduced levels of reflection from the regions of low reflectivity 113 (first embodiment) or 122 (second embodiment). Array 109 is a one-dimensional "linear" array, for example a Texas Instruments TSL1410 Black & White Linear Array chip with 128 pixels and an active window length of approximately 8 mm. This array is adapted to provide both an absolute angular position measurement and a fine resolution incremental angular position measurement. The absolute angular position measurement is performed by the reading of at least one complete word formed by a predetermined number of successive bits, in this case word 131 comprising five bits, so as to permit the identification of the word of the pseudo-random sequence representing the absolute angular position measurement. The disposition and use of such pseudo-random sequences are generally well known in the art of image analysis, and are described in U.S. Pat. No. 5,576,535 in reference to the measuring absolute linear displacement. Another example of one combination of such sequences is described as an Ouroborean ring in "Game, Set and Math" by Ian Stewart, Penguin Books, 1989.

The disposition of the regions of high and low EMR reflectivity employed in this embodiment of the present invention differs, however, since the pattern produced on array 109 comprises a sequence of bits of a constant centreline pitch "a" (ie. the spacing distance between the centreline of adjacent bars) with varying width "p" and "q". FIG. 34 shows five bit word 131, with binary number "1" represented by bits 130a and 130d having width "p" and binary number "0" represented by bits 130b, 130c and 130e having width "q". The complete word 131 is thus 10010 (ie. 18 in base 10), which is processed by processor 111 to provide a unique absolute angular position of rotatable body 101. Importantly, the disposition of regions of high and low EMR reflectivity, which results in a pattern on array 109 with constant pitch, allows the same pattern, and hence array, to be used for the measurement of fine resolution incremental angular position. One such interpolation technique is also shown in FIG. 34. The EMR intensity pattern on array 109 is denoted by P(x) where x is the horizontal scale representing angular displacement and P is a function of x.

If the EMR intensity pattern is sinusoidal, then:

$$P(x)=\sin[2n\,(x-d)/a]$$

Where a=pitch of the pattern, and
d=displacement of the pattern

The pattern P(x) is sampled by the individual pixels of array 109. Let $P_i$ denote the i-th sample. Thus the "pattern vector" of n samples can be denoted as $P=[P_1, P_2, P_3, \ldots P_n]$.

Two weighting functions are now defined, being the sine and cosine weighting vectors:

$$K_{1i}=\sin(2ni/a) \text{ for } i=1 \ldots n$$

$$K_{2i}=\cos(2ni/a) \text{ for } i=1 \ldots n$$

Hence phase angle α is given by:

$$\alpha=\arctan[(\Sigma P_i K_{1i})/(\Sigma P_i K_{2i})] \text{ for } i=1 \ldots n$$

The resulting phase angle α is a measure of the incremental displacement of the pattern relative to the sine and cosine weighting vectors and provides a fine resolution angular position measurement that is, on a statistical basis, many times finer than the width of one bit of the pattern. The coarse resolution absolute angular position measurement and fine resolution incremental angular position measurement is combined to provide an absolute angular position detector with fine resolution requiring only one detector array and with low susceptibility to mechanical deflection and misalignment.

The use of other styles of bar codes with constant pitch can be similarly processed according to this "convolution algorithm", for example where the binary bit information is coded as a difference in length of the bar rather than width. Also, the binary bit information can be encoded as a difference in the level of attenuation of the re-irradiated EMR such as by the use of a greyscale code. Moreover, although this embodiment demonstrates the convolution algorithm based on a bar code with constant bar pitch and variable bar width, it should be appreciated that the algorithm will also function equally successfully for a variable bar pitch situation, providing that that the bar pitching selected is an integer multiple of a "fundamental pitch". For example, referring to the terminology used in FIG. 34, the centreline pitching separating bits 130a–e may be arranged as respectively "a", "3a", "2a", and "a" (with a fundamental pitch of "a") rather than the constant pitch of "a" as shown in FIG. 34. Indeed any integer multiple of "a" may be used for the centreline pitch between successive bits. In the situation where such a varying pitch format of bar code is selected, the bar code encryption can be achieved via the varying pitch spacing rather than via bar width (as shown by the bit pattern in FIG. 34), thus it is feasible in this situation to use a constant bar width and still achieve satisfactory bar code encryption for coarse resolution absolute angular position measurement.

It should also be noted that the succession of bar codes could have reverse reflectivity compared to the embodiments described, that is high reflectivity regions imposed over a low reflectivity background.

Also in the present specification "high reflectivity" and "low reflectivity" is broadly defined in reference to the particular EMR source selected. For example, if a red light EMR source was used, the regions of high and low reflectivity of the surfaces of the reflective gratings may consist of regions which are painted (or otherwise coloured by some means) with a red and blue surface coating respectively.

Figure 35:
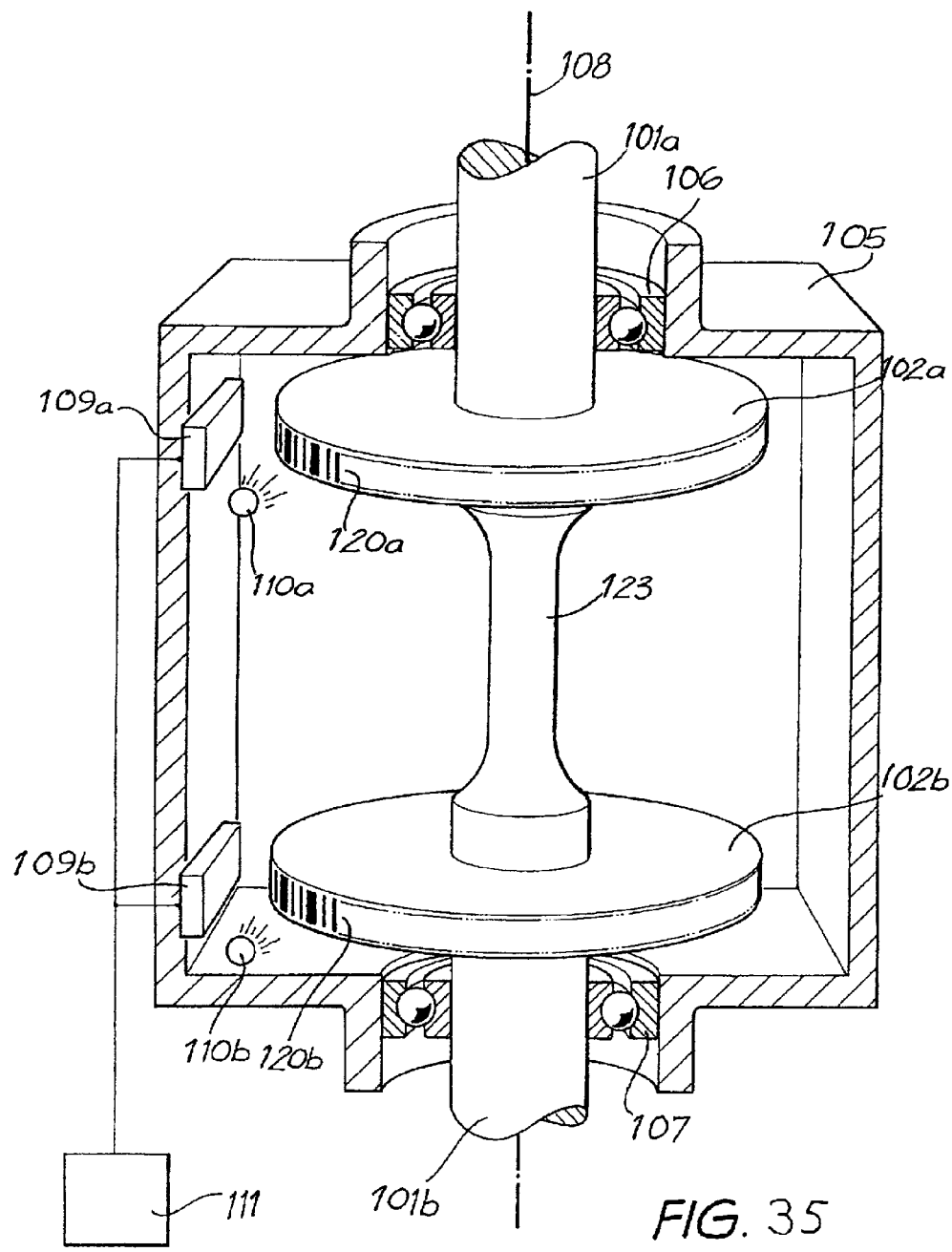
FIG. 35 is a diagrammatic sectional view of an angular position sensor according to a third embodiment of the present invention where the sensor comprises two rotatable bodies connected by a torsional member, and the sensor providing for measurement of the torque transmitted by the torsional member.

FIG. 35 shows an angular position sensor according to a third embodiment of the present invention. The angular position sensor comprises two rotatable bodies 101a & 101b which are connected by torsion bar 123 of predetermined torsional stiffness. Grating elements 102a & 102b are respectively attached to or integral with rotatable bodies 101a & 101b and arrays 109a & 109b respectively receive incident EMR re-radiated from surfaces 120a & 120b. In certain other embodiments (not shown) arrays 109a & 109b may be combined as a single array. This single array will therefore necessarily be a 2D array, and will receive EMR reflected from both surfaces 120a & 120b. Similarly, in certain other embodiments (not shown), EMR sources 110a & 110b may be combined as a single EMR source.

Surfaces 120a & 120b are shown as similar to surface 120 in FIGS. 32a & 32b, that is these surfaces are cylindrical and each comprise a graduated scale composed of alternating regions of high and low EMR reflectivity, and arranged in the form of an endless succession of individual binary bar codes. It will be recognised that other types of "surfaces of revolution" could alternatively be employed in place of these continuous cylindrical surfaces 120a & 120b, for example continuous flat disk surfaces (similar to surface 120 in FIGS. 33a & 33b), discontinuous cylindrical surfaces (similar to surface 114 in FIGS. 30a & 30b), or discontinuous flat disk surfaces (similar to surface 114 in FIGS. 31a & 31b). A "surface of revolution" of a body in this specification is defined as a surface which is equally disposed about the axis of rotation about which the body rotates.

The patterns on arrays 109a & 109b, or the pattern on the earlier mentioned single array (not shown), are processed in processor 111 to derive the absolute angular position of the regions of high and low reflectivity (or transmissibility in other embodiments) on surfaces 120a & 120b of each grating element 102a & 102b respectively with respect to housing 105. The difference between these absolute angular positions is further processed by processor 111 to derive the relative angular displacement of grating elements 102a & 102b, and hence provide a measure of the torque transmitted by torsion bar 123.

Thus this third embodiment of the angular position sensor not only provides a measure of the absolute angular position of each of the two rotatable bodies 101a & 101b (and potentially their angular velocity as described earlier) with respect to housing 105, but also provides a measure of the torque applied between rotatable bodies 101a & 101b (which is reacted by torsion bar 123).

It will be appreciated by those skilled in the art that numerous variations and modifications may be made to the invention without departing from the spirit and scope of the invention.

What is claimed is:

1. An angular position sensor comprising at least one body at least partially surrounded by a housing, the body rotatable about an axis of rotation fixed with respect to the housing, the body having a grating element attached thereto or integral therewith, the grating element comprising a surface of revolution about the axis of rotation, the surface comprising regions of high and low EMR reflectivity, the sensor also comprising at least one EMR source and at least one array of EMR sensitive detectors, the source irradiating the surface and the array receiving incident EMR reflected from the surface, the source and the array fixed with respect to the housing, a pattern thereby produced by incident EMR on the array at any instant of time resulting from the alternating regions of low and high reflectivity on the surface of the grating element, regardless of the angular position of the body, the output from the at least one array resulting from the pattern on the at least one array at said any instant of time is processed by a processor to derive the absolute angular position of the regions with respect to the housing, and hence provide a measure of the absolute angular position of the rotatable body with respect to the housing.

2. An angular position sensor as claimed in claim 1, wherein the at least one body comprises two rotatable bodies each of which has a respective grating element, the two bodies connected by a member of predetermined torsional stiffness, and at the at least one array of EMR sensitive detectors receiving the incident EMR reflected from the surfaces of the grating elements, the pattern or patterns processed to derive the absolute angular position of the regions on the surfaces of the grating elements with respect to the housing, and the difference between the angular positions further processed to derive the relative angular displacement of the grating elements, and hence provide a measure of the torque transmitted by the member.

3. An angular position sensor as claimed in claim 2, wherein the at least one array of EMR sensitive detectors is two arrays of EMR sensitive detectors, each of which is associated with a respective grating element.

4. An angular position sensor as claimed in claim 2, wherein the at least one EMR source is two EMR sources, each of which is associated with a respective grating element.

5. An angular position sensor as claimed in claim 1, wherein the surface of revolution is at least partially cylindrical.

6. An angular position sensor as claimed in claim 1, wherein the regions of high and low EMR reflectivity are a pseudo random distribution of regions arranged in the form of an endless succession of individual binary bar codes.

7. An angular position sensor as claimed in claim 1, wherein the body is a rotating shaft in a vehicle power steering system.

* * * * *